(12) United States Patent
Bassett

(10) Patent No.: US 10,980,174 B2
(45) Date of Patent: Apr. 20, 2021

(54) AGRICULTURAL MOWING DEVICE

(71) Applicant: Underground Agriculture, LLC, Sycamore, IL (US)

(72) Inventor: Joseph D. Bassett, Sycamore, IL (US)

(*) Notice: Subject to any disclaimer, the term of this patent is extended or adjusted under 35 U.S.C. 154(b) by 187 days.

(21) Appl. No.: 15/941,613

(22) Filed: Mar. 30, 2018

(65) Prior Publication Data
US 2018/0288939 A1    Oct. 11, 2018

Related U.S. Application Data

(63) Continuation-in-part of application No. 15/392,731, filed on Dec. 28, 2016, now Pat. No. 10,477,760.
(Continued)

(51) Int. Cl.
*A01D 34/835* (2006.01)
*A01D 34/86* (2006.01)
(Continued)

(52) U.S. Cl.
CPC ......... *A01D 34/835* (2013.01); *A01D 34/535* (2013.01); *A01D 34/661* (2013.01);
(Continued)

(58) Field of Classification Search
CPC .......... A01B 39/08; A01B 39/18; A01G 3/00; A01M 7/00; A01M 7/0025; A01M 7/02; A01M 7/043; A01M 7/21; A01D 34/835; A01D 34/535; A01D 34/661; A01D 34/662; A01D 34/822; A01D 34/44; A01D 34/62; A01D 34/64; A01D 34/863; A01D 43/14;
(Continued)

(56) References Cited

U.S. PATENT DOCUMENTS

| 114,002 A | 4/1871 | Godfrey |
| 123,966 A | 2/1872 | Wing |
(Continued)

FOREIGN PATENT DOCUMENTS

| BE | 551372 | 10/1956 |
| CA | 530673 | 9/1956 |
(Continued)

OTHER PUBLICATIONS

Case Corporation Brochure, Planters 900 Series Units/Modules Product Information, Aug. 1986 (4 pages).
(Continued)

*Primary Examiner* — Adam J Behrens
(74) *Attorney, Agent, or Firm* — Nixon Peabody LLP

(57) ABSTRACT

A mowing device for mowing material between rows of planted crops in an agricultural field, comprising a series of mower assemblies attached to a tractor and spaced from each other so that each mower assembly is located between an adjacent pair of rose of a printed crop. Multiple blades are mounted for rotation on each mower assembly for cutting material growing in the space between adjacent pairs of rows of a planted crop. A first deflector in front of each mower assembly moves planted crops around the outside of the mower assemblies so as not to be cut by the mower assemblies. A second deflector may be provided within each mower assembly and located rearwardly of the blades to push mowed material laterally toward the adjacent rows of a planted crop.

8 Claims, 18 Drawing Sheets

Related U.S. Application Data

(60) Provisional application No. 62/271,770, filed on Dec. 28, 2015.

(51) Int. Cl.

| | | |
|---|---|---|
| *A01B 39/08* | (2006.01) | |
| *A01B 39/18* | (2006.01) | |
| *A01D 34/82* | (2006.01) | |
| *A01D 34/66* | (2006.01) | |
| *A01D 34/535* | (2006.01) | |
| *A01M 7/00* | (2006.01) | |
| *A01D 43/14* | (2006.01) | |
| *A01M 21/02* | (2006.01) | |
| *A01M 21/04* | (2006.01) | |

(52) U.S. Cl.
CPC ......... *A01D 34/662* (2013.01); *A01D 34/822* (2013.01); *A01D 43/14* (2013.01); *A01M 7/00* (2013.01); *A01M 21/02* (2013.01); *A01M 21/043* (2013.01)

(58) Field of Classification Search
CPC ...... A01D 41/148; A01D 45/10; A01D 75/30; A01D 75/303; A01D 75/306
See application file for complete search history.

(56) References Cited

U.S. PATENT DOCUMENTS

| | | | |
|---|---|---|---|
| 321,906 A | 7/1885 | McCormick | |
| 353,491 A | 2/1886 | Wells | |
| 523,508 A | 7/1894 | Bauer | |
| 736,369 A | 8/1903 | Dynes | |
| 803,088 A | 10/1905 | Barker | |
| 1,069,264 A | 8/1913 | Keller | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,442,032 A * | 1/1923 | Luce | A01D 45/10 56/53 |
| 1,481,981 A | 1/1924 | Boye | |
| 1,791,462 A | 2/1931 | Bermel | |
| 1,844,255 A | 2/1932 | Kaupke | |
| 1,901,299 A | 3/1933 | Johnson | |
| 1,901,778 A | 3/1933 | Schlag | |
| 1,938,132 A | 12/1933 | Broemmelsick | |
| 2,014,334 A | 9/1935 | Johnson | |
| 2,058,539 A | 10/1936 | Welty | |
| 2,249,637 A | 7/1941 | Rietz | |
| 2,269,051 A | 1/1942 | Cahoy | |
| 2,285,932 A | 6/1942 | Leavitt | |
| 2,298,539 A | 10/1942 | Mott | |
| 2,341,143 A | 2/1944 | Herr | |
| 2,505,276 A | 4/1950 | Boroski | |
| 2,561,763 A | 7/1951 | Waters | |
| 2,593,176 A | 4/1952 | Patterson | |
| 2,596,527 A | 5/1952 | Bushong | |
| 2,611,306 A | 9/1952 | Strehlow | |
| 2,612,827 A | 10/1952 | Baggette | |
| 2,664,040 A | 12/1953 | Beard | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. | |
| 2,860,716 A | 11/1958 | Flock | |
| 2,878,633 A * | 3/1959 | Mullin | A01D 43/14 56/16.8 |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman | |
| 3,057,092 A | 10/1962 | Curlett | |
| 3,058,243 A | 10/1962 | McGee | |
| 3,065,879 A | 11/1962 | Jennings | |
| 3,080,004 A | 3/1963 | McNair | |
| 3,082,829 A * | 3/1963 | Buddingh | A01B 39/08 172/184 |
| 3,103,993 A | 9/1963 | Gies | |
| 3,110,973 A | 11/1963 | Reynolds | |
| 3,115,739 A * | 12/1963 | Thoen | A01D 34/863 56/6 |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,256,942 A | 6/1966 | Van Sickle | |
| 3,261,150 A * | 7/1966 | Fitzgerald, Sr. | A01D 34/863 56/13.7 |
| 3,314,278 A | 4/1967 | Bergman | |
| 3,319,589 A | 5/1967 | Moran | |
| 3,351,139 A | 11/1967 | Schmitz | |
| 3,355,930 A | 12/1967 | Fedorov | |
| 3,368,788 A | 2/1968 | Padula | |
| 3,368,789 A | 2/1968 | Martin | |
| 3,370,450 A | 2/1968 | Scheucher | |
| 3,397,933 A | 8/1968 | Hatcher | |
| 3,420,273 A | 1/1969 | Greer | |
| 3,433,474 A | 3/1969 | Piret | |
| 3,447,495 A | 6/1969 | Miller | |
| 3,498,036 A * | 3/1970 | Cowling | A01D 34/863 56/11.9 |
| 3,500,937 A | 3/1970 | Erickson | |
| 3,507,233 A | 4/1970 | Greig | |
| 3,539,020 A | 11/1970 | Andersson | |
| 3,543,603 A | 12/1970 | Gley | |
| 3,561,541 A | 2/1971 | Woelfel | |
| 3,576,098 A | 4/1971 | Brewer | |
| 3,581,685 A | 6/1971 | Taylor | |
| 3,593,720 A | 7/1971 | Botterill | |
| D221,461 S | 8/1971 | Hagenstad | |
| 3,599,403 A * | 8/1971 | Gantz | A01D 34/863 56/10.4 |
| 3,606,745 A | 9/1971 | Girodat | |
| 3,635,495 A | 1/1972 | Orendorff | |
| 3,650,334 A | 3/1972 | Hagenstad | |
| 3,653,446 A | 4/1972 | Kalmon | |
| 3,701,327 A | 10/1972 | Krumholz | |
| 3,708,019 A | 1/1973 | Ryan | |
| 3,711,974 A | 1/1973 | Webb | |
| 3,718,191 A | 2/1973 | Williams | |
| 3,749,035 A | 7/1973 | Cayton | |
| 3,753,341 A | 8/1973 | Berg, Jr. | |
| 3,766,988 A | 10/1973 | Whitesides | |
| 3,774,446 A | 11/1973 | Diehl | |
| 3,795,291 A | 3/1974 | Naito | |
| 3,906,814 A | 9/1975 | Magnussen | |
| 3,939,846 A | 2/1976 | Drozhzhin | |
| 3,945,532 A | 3/1976 | Marks | |
| 3,970,012 A * | 7/1976 | Jones, Sr. | A01B 21/04 111/118 |
| 3,975,890 A | 8/1976 | Rodger | |
| 3,986,464 A | 10/1976 | Uppiano | |
| 4,009,668 A | 3/1977 | Brass | |
| 4,018,101 A | 4/1977 | Mihalic | |
| 4,044,697 A | 8/1977 | Swanson | |
| 4,055,126 A | 10/1977 | Brown | |
| 4,058,171 A | 11/1977 | Van der Lely | |
| 4,063,597 A | 12/1977 | Day | |
| 4,069,029 A | 1/1978 | Hudson | |
| 4,096,730 A | 6/1978 | Martin | |
| 4,099,576 A | 7/1978 | Jilani | |

(56) References Cited

U.S. PATENT DOCUMENTS

| | | | |
|---|---|---|---|
| 4,104,851 A * | 8/1978 | Perry | A01D 34/866 369/63 |
| 4,122,715 A | 10/1978 | Yokoyama | |
| 4,129,082 A | 12/1978 | Betulius | |
| 4,135,349 A * | 1/1979 | Schwertner | A01D 75/30 56/503 |
| 4,141,200 A | 2/1979 | Johnson | |
| 4,141,302 A | 2/1979 | Morrison, Jr. | |
| 4,141,676 A | 2/1979 | Jannen | |
| 4,142,589 A | 3/1979 | Schlagenhauf | |
| 4,147,305 A | 4/1979 | Hunt | |
| 4,149,475 A | 4/1979 | Bailey | |
| 4,157,661 A | 6/1979 | Schindel | |
| 4,161,090 A | 7/1979 | Watts, Jr. | |
| 4,173,259 A | 11/1979 | Heckenkamp | |
| 4,182,099 A | 1/1980 | Davis | |
| 4,187,916 A | 2/1980 | Harden | |
| 4,191,262 A | 3/1980 | Sylvester | |
| 4,194,575 A | 3/1980 | Whalen | |
| 4,196,567 A | 4/1980 | Davis | |
| 4,196,917 A | 4/1980 | Oakes | |
| 4,206,817 A | 6/1980 | Bowerman | |
| 4,208,974 A | 6/1980 | Dreyer | |
| 4,213,408 A | 7/1980 | West | |
| 4,225,191 A | 9/1980 | Knoski | |
| 4,233,803 A | 11/1980 | Davis | |
| 4,241,674 A | 12/1980 | Mellinger | |
| 4,249,613 A | 2/1981 | Scribner | |
| 4,280,419 A | 7/1981 | Fischer | |
| 4,294,181 A * | 10/1981 | Smith | A01B 39/08 111/121 |
| 4,295,532 A | 10/1981 | Williams | |
| 4,301,870 A | 11/1981 | Carre | |
| 4,307,674 A | 12/1981 | Jennings | |
| 4,311,104 A | 1/1982 | Steilen | |
| 4,317,355 A | 3/1982 | Hatsuno | |
| 4,359,101 A | 11/1982 | Gagnon | |
| 4,375,837 A | 3/1983 | van der Lely | |
| 4,377,979 A | 3/1983 | Peterson | |
| 4,384,444 A * | 5/1983 | Rossler, Jr. | A01D 34/662 172/526 |
| 4,391,335 A | 7/1983 | Birkenbach | |
| 4,398,608 A | 8/1983 | Boetto | |
| 4,407,371 A | 10/1983 | Hohl | |
| 4,407,660 A | 10/1983 | Nevens | |
| 4,413,685 A | 11/1983 | Gremelspacher | |
| 4,430,952 A | 2/1984 | Murray | |
| 4,433,568 A | 2/1984 | Kondo | |
| 4,438,710 A | 3/1984 | Paladino | |
| 4,445,445 A | 5/1984 | Sterrett | |
| 4,461,355 A | 7/1984 | Peterson | |
| 4,481,830 A | 11/1984 | Smith | |
| 4,499,775 A | 2/1985 | Lasoen | |
| 4,506,610 A | 3/1985 | Neal | |
| 4,508,178 A | 4/1985 | Cowell | |
| 4,528,920 A | 7/1985 | Neumeyer | |
| 4,530,405 A | 7/1985 | White | |
| 4,537,262 A | 8/1985 | van der Lely | |
| 4,538,688 A | 9/1985 | Szucs | |
| 4,550,122 A | 10/1985 | David | |
| 4,553,607 A | 11/1985 | Behn | |
| 4,580,506 A | 4/1986 | Fleischer | |
| 4,596,200 A | 6/1986 | Gafford | |
| 4,598,654 A | 7/1986 | Robertson | |
| 4,603,746 A | 8/1986 | Swales | |
| 4,604,906 A | 8/1986 | Scarpa | |
| 4,619,329 A | 10/1986 | Gorbett | |
| 4,630,773 A | 12/1986 | Ortlip | |
| 4,643,043 A | 2/1987 | Furuta | |
| 4,646,620 A | 3/1987 | Buchl | |
| 4,646,850 A | 3/1987 | Brown | |
| 4,648,466 A | 3/1987 | Baker | |
| 4,650,005 A | 3/1987 | Tebben | |
| 4,669,550 A | 6/1987 | Sittre | |
| 4,671,193 A | 6/1987 | States | |
| 4,674,578 A | 6/1987 | Bexten | |
| 4,682,550 A | 7/1987 | Joy | |
| 4,703,809 A | 11/1987 | Van den Ende | |
| 4,726,304 A | 2/1988 | Dreyer | |
| RE32,644 E | 4/1988 | Brundage | |
| 4,738,461 A | 4/1988 | Stephenson | |
| 4,744,316 A | 5/1988 | Lienemann | |
| 4,762,075 A | 8/1988 | Halford | |
| 4,765,190 A | 8/1988 | Strubbe | |
| 4,768,387 A | 9/1988 | Kemp | |
| 4,776,404 A | 10/1988 | Rogers | |
| 4,779,684 A | 10/1988 | Schultz | |
| 4,785,890 A | 11/1988 | Martin | |
| 4,819,738 A | 4/1989 | Fountain | |
| 4,825,957 A | 5/1989 | White | |
| 4,825,959 A | 5/1989 | Wilhelm | |
| 4,919,211 A | 4/1990 | Cope | |
| 4,920,901 A | 5/1990 | Pounds | |
| 4,926,622 A * | 5/1990 | McKee | A01D 43/14 56/16.8 |
| 4,926,767 A | 5/1990 | Thomas | |
| 4,930,431 A | 6/1990 | Alexander | |
| 4,986,367 A | 1/1991 | Kinzenbaw | |
| 4,987,841 A | 1/1991 | Rawson | |
| 4,998,488 A | 3/1991 | Hansson | |
| 5,015,997 A | 5/1991 | Strubbe | |
| 5,022,333 A | 6/1991 | McClure | |
| 5,027,525 A | 7/1991 | Haukaas | |
| 5,033,397 A | 7/1991 | Colburn, Jr. | |
| 5,065,632 A | 11/1991 | Reuter | |
| 5,074,227 A | 12/1991 | Schwitters | |
| 5,076,180 A | 12/1991 | Schneider | |
| 5,092,255 A | 3/1992 | Long | |
| 5,113,957 A | 5/1992 | Tamai | |
| 5,129,282 A | 7/1992 | Bassett | |
| 5,136,934 A | 8/1992 | Darby, Jr. | |
| 5,190,112 A | 3/1993 | Johnston | |
| 5,224,553 A | 7/1993 | Heintzman | |
| 5,234,060 A | 8/1993 | Carter | |
| 5,240,080 A | 8/1993 | Bassett | |
| 5,255,617 A | 10/1993 | Williams | |
| 5,269,237 A | 12/1993 | Baker | |
| 5,282,389 A | 2/1994 | Faivre | |
| 5,285,854 A | 2/1994 | Thacker | |
| 5,333,694 A | 8/1994 | Roggenbuck | |
| 5,337,832 A | 8/1994 | Bassett | |
| 5,341,754 A | 8/1994 | Winterton | |
| 5,346,019 A | 9/1994 | Kinzenbaw | |
| 5,346,020 A | 9/1994 | Bassett | |
| 5,349,911 A | 9/1994 | Holst | |
| 5,351,635 A | 10/1994 | Hulicsko | |
| 5,379,847 A | 1/1995 | Snyder | |
| 5,394,946 A | 3/1995 | Clifton | |
| 5,398,771 A | 3/1995 | Hornung | |
| 5,419,402 A | 5/1995 | Heintzman | |
| 5,427,192 A | 6/1995 | Stephenson | |
| 5,443,023 A | 8/1995 | Carroll | |
| 5,443,125 A | 8/1995 | Clark | |
| 5,461,995 A | 10/1995 | Winterton | |
| 5,462,124 A | 10/1995 | Rawson | |
| 5,473,999 A | 12/1995 | Rawson | |
| 5,474,135 A | 12/1995 | Schlagel | |
| 5,477,682 A | 12/1995 | Tobiasz | |
| 5,477,792 A | 12/1995 | Bassett | |
| 5,479,868 A | 1/1996 | Bassett | |
| 5,479,992 A | 1/1996 | Bassett | |
| 5,485,796 A | 1/1996 | Bassett | |
| 5,485,886 A | 1/1996 | Bassett | |
| 5,497,717 A | 3/1996 | Martin | |
| 5,497,837 A | 3/1996 | Kehrney | |
| 5,499,042 A | 3/1996 | Yanagawa | |
| 5,499,683 A | 3/1996 | Bassett | |
| 5,499,685 A | 3/1996 | Downing, Jr. | |
| 5,517,932 A | 5/1996 | Ott | |
| 5,524,525 A | 6/1996 | Nikkel | |
| 5,531,171 A | 7/1996 | Whitesel | |
| 5,542,362 A | 8/1996 | Bassett | |
| 5,544,709 A | 8/1996 | Lowe | |
| 5,562,165 A | 10/1996 | Janelle | |

(56) References Cited

U.S. PATENT DOCUMENTS

| | | | |
|---|---|---|---|
| 5,590,611 A | 1/1997 | Smith | |
| 5,603,269 A | 2/1997 | Bassett | |
| 5,623,997 A | 4/1997 | Rawson | |
| 5,640,914 A | 6/1997 | Rawson | |
| 5,657,707 A | 8/1997 | Dresher | |
| 5,660,126 A | 8/1997 | Freed | |
| 5,685,245 A | 11/1997 | Bassett | |
| 5,704,430 A | 1/1998 | Smith | |
| 5,709,271 A | 1/1998 | Bassett | |
| 5,725,057 A | 3/1998 | Taylor | |
| 5,727,638 A | 3/1998 | Wodrich | |
| 5,730,074 A | 3/1998 | Peter | |
| 5,771,669 A * | 6/1998 | Langworthy | A01D 75/306 56/6 |
| 5,809,757 A | 9/1998 | McLean | |
| 5,852,982 A | 12/1998 | Peter | |
| 5,868,207 A | 2/1999 | Langbakk | |
| 5,878,678 A | 3/1999 | Stephens | |
| RE36,243 E | 7/1999 | Rawson | |
| 5,953,895 A | 9/1999 | Hobbs | |
| 5,970,891 A | 10/1999 | Schlagel | |
| 5,970,892 A | 10/1999 | Wendling | |
| 5,988,293 A | 11/1999 | Brueggen | |
| 6,067,918 A | 5/2000 | Kirby | |
| 6,068,061 A | 5/2000 | Smith | |
| 6,079,340 A | 6/2000 | Flamme | |
| 6,082,274 A | 7/2000 | Peter | |
| 6,085,501 A | 7/2000 | Walch | |
| 6,091,997 A | 7/2000 | Flamme | |
| 6,145,288 A * | 11/2000 | Tamian | A01C 23/00 56/16.4 A |
| 6,164,385 A | 12/2000 | Buchl | |
| 6,176,334 B1 | 1/2001 | Lorenzen | |
| 6,223,663 B1 | 5/2001 | Wendling | |
| 6,223,828 B1 | 5/2001 | Paulson | |
| 6,237,696 B1 | 5/2001 | Mayerle | |
| 6,253,692 B1 | 7/2001 | Wendling | |
| 6,289,829 B1 | 9/2001 | Fish | |
| 6,295,939 B1 | 10/2001 | Emms | |
| 6,314,897 B1 | 11/2001 | Hagny | |
| 6,325,156 B1 | 12/2001 | Barry | |
| 6,330,922 B1 | 12/2001 | King | |
| 6,331,142 B1 | 12/2001 | Bischoff | |
| 6,343,661 B1 | 2/2002 | Thomspon | |
| 6,347,594 B1 | 2/2002 | Wendling | |
| 6,382,326 B1 | 5/2002 | Goins | |
| 6,389,999 B1 | 5/2002 | Duello | |
| 6,453,832 B1 | 9/2002 | Schaffert | |
| 6,454,019 B1 | 9/2002 | Prairie | |
| 6,460,623 B1 | 10/2002 | Knussman | |
| 6,497,088 B1 * | 12/2002 | Holley | A01D 43/14 239/67 |
| 6,516,595 B2 | 2/2003 | Rhody | |
| 6,526,735 B2 * | 3/2003 | Meyer | A01D 75/303 56/6 |
| 6,530,334 B2 | 3/2003 | Hagny | |
| 6,575,104 B2 | 6/2003 | Brummelhuis | |
| 6,622,468 B2 | 9/2003 | Lucand | |
| 6,644,224 B1 | 11/2003 | Bassett | |
| 6,681,868 B2 | 1/2004 | Kovach | |
| 6,701,856 B1 | 3/2004 | Zoke | |
| 6,701,857 B1 | 3/2004 | Jensen | |
| 6,715,433 B1 | 4/2004 | Friestad | |
| 6,763,773 B2 | 7/2004 | Schaffert | |
| 6,786,130 B2 | 9/2004 | Steinlage | |
| 6,827,029 B1 | 12/2004 | Wendte | |
| 6,834,598 B2 | 12/2004 | Jüptner | |
| 6,840,853 B2 | 1/2005 | Foth | |
| 6,886,650 B2 | 5/2005 | Bremmer | |
| 6,889,943 B2 | 5/2005 | Dinh | |
| 6,892,656 B2 | 5/2005 | Schneider | |
| 6,907,833 B2 | 6/2005 | Thompson | |
| 6,908,052 B1 * | 6/2005 | Jacobson | A01D 43/14 239/146 |
| 6,912,963 B2 | 7/2005 | Bassett | |
| 6,923,390 B1 | 8/2005 | Barker | |
| 6,968,907 B1 | 11/2005 | Raper | |
| 6,986,313 B2 | 1/2006 | Halford | |
| 6,997,400 B1 | 2/2006 | Hanna | |
| 7,004,090 B2 | 2/2006 | Swanson | |
| 7,044,070 B2 | 5/2006 | Kaster | |
| 7,063,167 B1 | 6/2006 | Staszak | |
| 7,159,523 B2 | 1/2007 | Bourgault | |
| 7,163,227 B1 | 1/2007 | Burns | |
| 7,222,575 B2 | 5/2007 | Bassett | |
| 7,249,448 B2 * | 7/2007 | Murphy | A01D 47/00 56/15.8 |
| 7,290,491 B2 | 11/2007 | Summach | |
| 7,325,756 B1 | 2/2008 | Giorgis | |
| 7,347,036 B1 * | 3/2008 | Easley, Jr. | A01D 75/30 172/313 |
| 7,360,494 B2 | 4/2008 | Martin | |
| 7,360,495 B1 | 4/2008 | Martin | |
| 7,438,006 B2 | 10/2008 | Mariman | |
| 7,451,712 B2 | 11/2008 | Bassett | |
| 7,497,174 B2 | 3/2009 | Sauder | |
| 7,523,709 B1 | 4/2009 | Kiest | |
| 7,540,333 B2 | 6/2009 | Bettin | |
| 7,575,066 B2 | 8/2009 | Bauer | |
| 7,584,707 B2 | 9/2009 | Sauder | |
| 7,665,539 B2 | 2/2010 | Bassett | |
| 7,673,570 B1 | 3/2010 | Bassett | |
| 7,743,718 B2 | 6/2010 | Bassett | |
| 7,870,827 B2 | 1/2011 | Bassett | |
| 7,900,429 B2 * | 3/2011 | Labar | A01D 34/733 56/16.8 |
| 7,918,285 B1 | 4/2011 | Graham | |
| 7,938,074 B2 | 5/2011 | Liu | |
| 7,944,210 B2 | 5/2011 | Fischer | |
| 7,946,231 B2 | 5/2011 | Martin | |
| 7,975,629 B1 | 7/2011 | Martin | |
| 8,146,519 B2 | 4/2012 | Bassett | |
| 8,151,717 B2 | 4/2012 | Bassett | |
| 8,171,707 B2 | 5/2012 | Kitchel | |
| D663,326 S | 7/2012 | Allensworth | |
| 8,327,780 B2 | 12/2012 | Bassett | |
| 8,359,988 B2 | 1/2013 | Bassett | |
| 8,380,356 B1 | 2/2013 | Zielke | |
| 8,386,137 B2 | 2/2013 | Sauder | |
| 8,393,407 B2 | 3/2013 | Freed | |
| 8,408,149 B2 | 4/2013 | Rylander | |
| 8,544,397 B2 | 10/2013 | Bassett | |
| 8,544,398 B2 | 10/2013 | Bassett | |
| 8,550,020 B2 | 10/2013 | Sauder | |
| 8,573,319 B1 | 11/2013 | Casper | |
| 8,634,992 B2 | 1/2014 | Sauder | |
| 8,636,077 B2 | 1/2014 | Bassett | |
| 8,649,930 B2 | 2/2014 | Reeve | |
| 8,746,661 B2 | 6/2014 | Runkel | |
| 8,763,713 B2 | 7/2014 | Bassett | |
| 8,770,308 B2 | 7/2014 | Bassett | |
| 8,776,702 B2 | 7/2014 | Bassett | |
| RE45,091 E | 8/2014 | Bassett | |
| 8,863,857 B2 | 10/2014 | Bassett | |
| 8,910,581 B2 | 12/2014 | Bassett | |
| 8,939,095 B2 | 1/2015 | Freed | |
| 8,985,232 B2 | 3/2015 | Bassett | |
| 9,003,982 B1 | 4/2015 | Elizalde | |
| 9,003,983 B2 | 4/2015 | Roth | |
| 9,055,712 B2 | 6/2015 | Bassett | |
| 9,107,337 B2 | 8/2015 | Bassett | |
| 9,107,338 B2 | 8/2015 | Bassett | |
| 9,113,589 B2 | 8/2015 | Bassett | |
| 9,144,187 B2 | 9/2015 | Bassett | |
| 9,148,989 B2 | 10/2015 | Van Buskirk | |
| 9,167,740 B2 | 10/2015 | Bassett | |
| 9,192,088 B2 | 11/2015 | Bruce | |
| 9,192,089 B2 | 11/2015 | Bassett | |
| 9,192,091 B2 | 11/2015 | Bassett | |
| 9,215,838 B2 | 12/2015 | Bassett | |
| 9,215,839 B2 | 12/2015 | Bassett | |
| 9,226,440 B2 | 1/2016 | Bassett | |
| 9,232,687 B2 | 1/2016 | Bassett | |

(56) References Cited

U.S. PATENT DOCUMENTS

| | | |
|---|---|---|
| 9,241,438 B2 | 1/2016 | Bassett |
| 9,271,437 B2 | 3/2016 | Martin |
| 9,307,690 B2 | 4/2016 | Bassett |
| 9,392,743 B2 * | 7/2016 | Camacho-Cook ... A01B 69/008 |
| 9,504,195 B2 | 11/2016 | Bassett |
| 9,615,497 B2 | 4/2017 | Bassett |
| 9,668,398 B2 | 6/2017 | Bassett |
| 9,681,601 B2 | 6/2017 | Bassett |
| 9,723,778 B2 | 8/2017 | Bassett |
| 9,788,472 B2 | 10/2017 | Bassett |
| 9,848,522 B2 | 12/2017 | Bassett |
| 9,861,022 B2 | 1/2018 | Bassett |
| 2002/0162492 A1 | 11/2002 | Juptner |
| 2003/0141086 A1 | 7/2003 | Kovach |
| 2004/0005929 A1 | 1/2004 | Piasecki |
| 2004/0148917 A1 * | 8/2004 | Eastwood ............ A01D 75/306 56/6 |
| 2005/0000202 A1 * | 1/2005 | Scordilis ............ A01D 34/863 56/14.7 |
| 2005/0045080 A1 | 3/2005 | Halford |
| 2005/0199842 A1 | 9/2005 | Parsons |
| 2006/0102058 A1 | 5/2006 | Swanson |
| 2006/0118662 A1 | 6/2006 | Korus |
| 2006/0191695 A1 | 8/2006 | Walker et al. |
| 2006/0213566 A1 | 9/2006 | Johnson |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2009/0133888 A1 | 5/2009 | Kovach |
| 2009/0260902 A1 | 10/2009 | Holman |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0101135 A1 | 5/2011 | Korus |
| 2011/0147148 A1 | 6/2011 | Ripa |
| 2011/0247537 A1 | 10/2011 | Freed |
| 2011/0313575 A1 | 12/2011 | Kowalchuk |
| 2012/0010782 A1 | 1/2012 | Grabow |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0000448 A1 | 1/2014 | Franklin, III |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0165527 A1 | 6/2014 | Oehler |
| 2014/0190712 A1 | 7/2014 | Bassett |
| 2014/0197249 A1 | 7/2014 | Roth |
| 2014/0224513 A1 | 8/2014 | Van Buskirk |
| 2014/0224843 A1 | 8/2014 | Rollenhagen |
| 2014/0278696 A1 | 9/2014 | Anderson |
| 2015/0216108 A1 | 8/2015 | Roth |
| 2016/0100517 A1 | 4/2016 | Bassett |
| 2016/0270285 A1 | 9/2016 | Hennes |
| 2016/0309641 A1 | 10/2016 | Taunton |
| 2017/0034985 A1 | 2/2017 | Martin |
| 2017/0099769 A1 * | 4/2017 | Badalini ............ A01D 34/66 |
| 2017/0127614 A1 * | 5/2017 | Button ............ A01D 34/005 |
| 2017/0164548 A1 | 6/2017 | Bassett |
| 2017/0300072 A1 | 7/2017 | Bassett |
| 2017/0231145 A1 | 8/2017 | Bassett |
| 2017/0303467 A1 * | 10/2017 | Simmons ........... A01D 34/4163 |
| 2017/0318741 A1 | 11/2017 | Bassett |
| 2017/0359940 A1 | 12/2017 | Bassett |
| 2018/0000001 A1 | 1/2018 | Bassett |
| 2018/0000002 A1 | 1/2018 | Bassett |
| 2018/0007834 A1 * | 1/2018 | Martin ................ A01D 75/303 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | |
| DE | 3830141 | * 2/1990 | ............ A01D 34/66 |
| EP | 2 196 337 B1 | 6/2010 | |
| EP | 2 497 348 A1 | 9/2012 | |
| GB | 1 574 412 | 9/1980 | |
| GB | 2 056 238 A | 10/1982 | |
| GB | 2 160 401 A | 12/1985 | |
| JP | 54-57726 | 5/1979 | |
| SU | 392897 | 8/1973 | |
| SU | 436778 | 7/1974 | |
| SU | 611201 | 6/1978 | |
| SU | 625648 | 9/1978 | |
| SU | 1410884 A1 | 7/1988 | |
| SU | 1466674 | 3/1989 | |
| WO | WO 2001/023241 A2 | 4/2001 | |
| WO | WO 2009/145381 A1 | 12/2009 | |
| WO | WO 2011/161140 A1 | 12/2011 | |
| WO | WO 2012/149367 A1 | 1/2012 | |
| WO | WO 2012/149415 A1 | 1/2012 | |
| WO | WO 2012/167244 A1 | 12/2012 | |
| WO | WO 2013/025898 A1 | 2/2013 | |
| WO | WO 2016/073964 A1 | 5/2016 | |
| WO | WO 2016/073966 A1 | 5/2016 | |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "New Efficiencies in Nitrogen Application," Feb. 1991, p. 6 (1 page).

Hiniker Company, Flow & Acreage Continuous Tracking System Monitor Demonstration Manuel, date estimated as early as Feb. 1991 (7 pages).

Russnogle, John, "Sky Spy: Gulf War Technology Pinpoints Field and Yields," Top Producer, A Farm Journal Publication, Nov. 1991, pp. 12-14 (4 pages).

Borgelt, Steven C., "Sensor Technologies and Control Strategies for Managing Variability," University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Exner, Rick, "Sustainable Agriculture: Practical Farmers of Iowa Reducing Weed Pressure in Ridge-Till," Iowa State University University Extension, http://www.extension.iastate.edu/Publications/SA2.pdf, Jul. 1992, Reviewed Jul. 2009, retrieved Nov. 2, 2012 (4 pages).

Finck, Charlene, "Listen to Your Soil," Farm Journal Article, Jan. 1993, pp. 14-15 (2 pages).

Acu-Grain, "Combine Yield Monitor 99% Accurate? 'You Bet Your Bushels!!'" date estimated as early as Feb. 1993 (2 pages).

John Deere, New 4435 Hydro Row-Crop and Small-Grain Combine, date estimated as early as Feb. 1993 (8 pages).

Vansichen, R. et al., "Continuous Wheat Yield Measurement on a Combine," date estimated as early as Feb. 1993 (5 pages).

(56) References Cited

OTHER PUBLICATIONS

Yetter 2010 Product Catalog, date estimated as early as Jan. 2010 (2 pages).
Yetter Cut and Move Manual, Sep. 2010 (28 pages).
Yetter Screw Adjust Residue Manager Operator's Manual, labeled "2565-729_REV_D" and dated Sep. 10 on p. 36, retrieved Mar. 10, 2014 from the internet, available Jul. 13, 2011, at https://web.archive.org/web/20110713162510/http://www.yetterco.com/help/manuals/Screw_Adjust_Residue_Manager2.pdf.
John Deere, Seat Catalog, date estimated as early Sep. 2011 (19 pages).
Martin Industries, LLC Paired 13" Spading Closing Wheels Brochure, date estimated as early as Jun. 6, 2012, pp. 18-25 (8 pages).
Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

\* cited by examiner

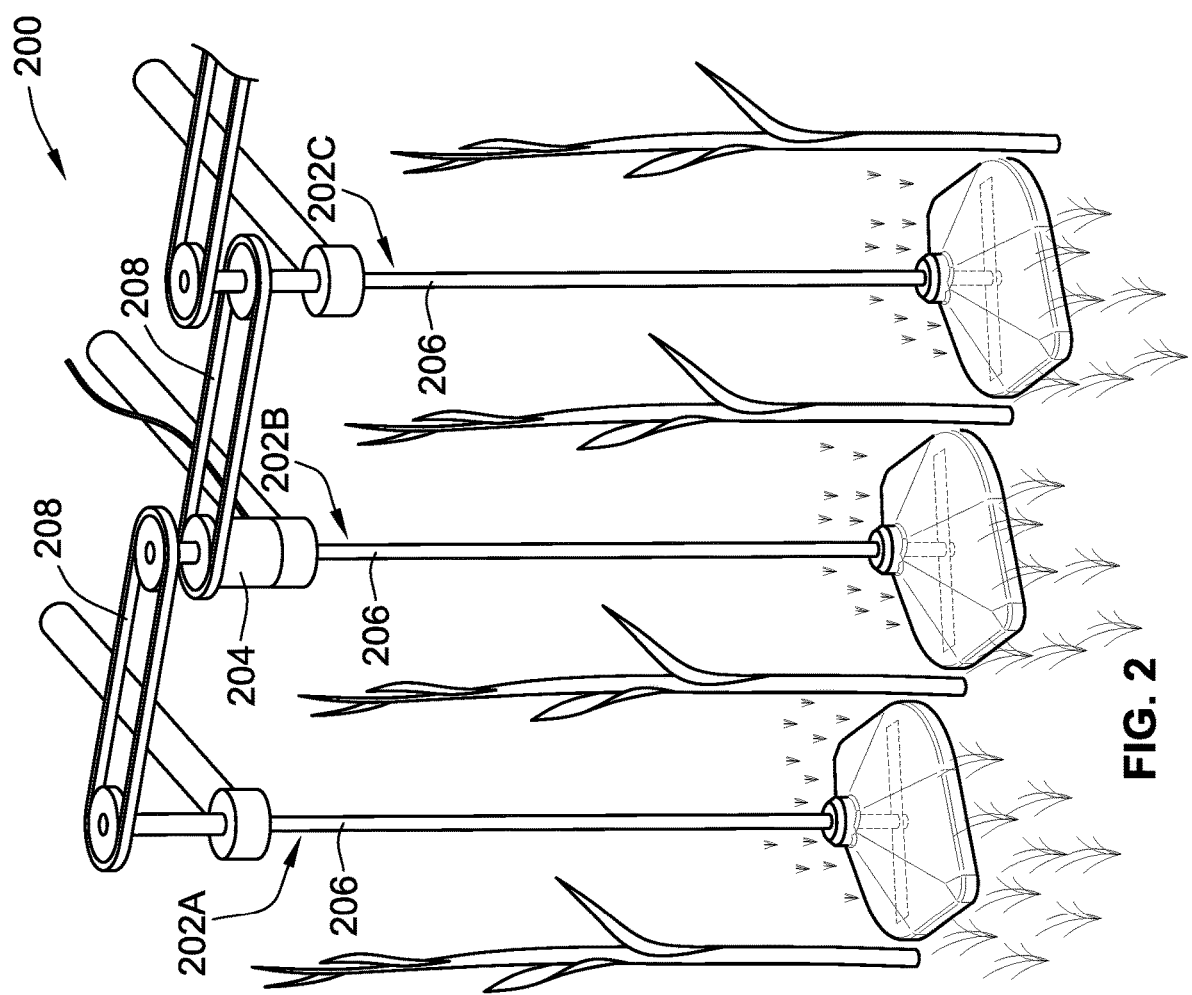
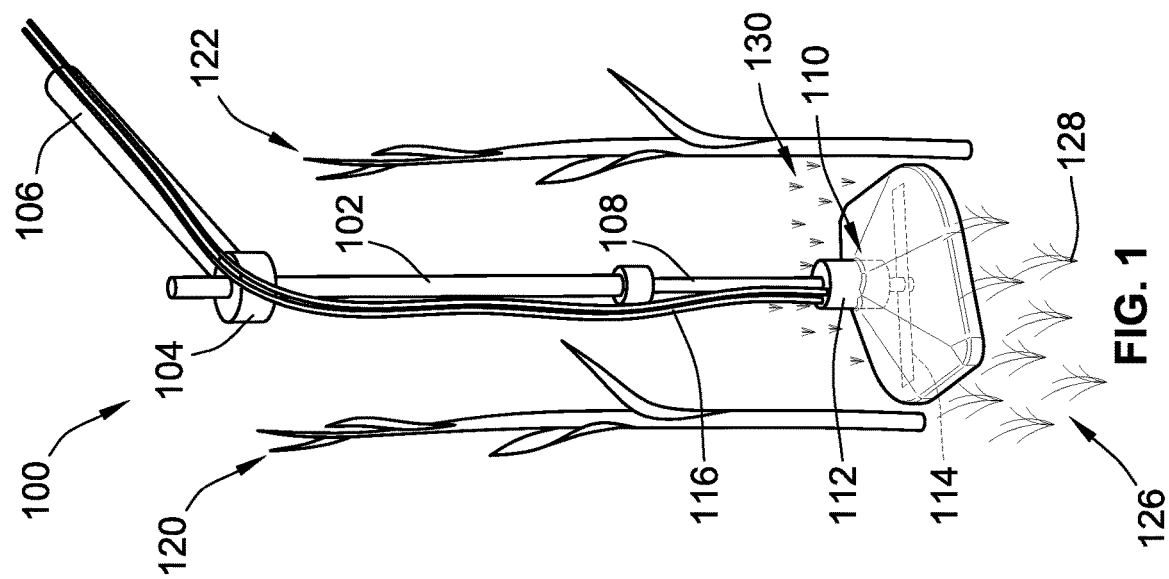
FIG. 2
FIG. 1

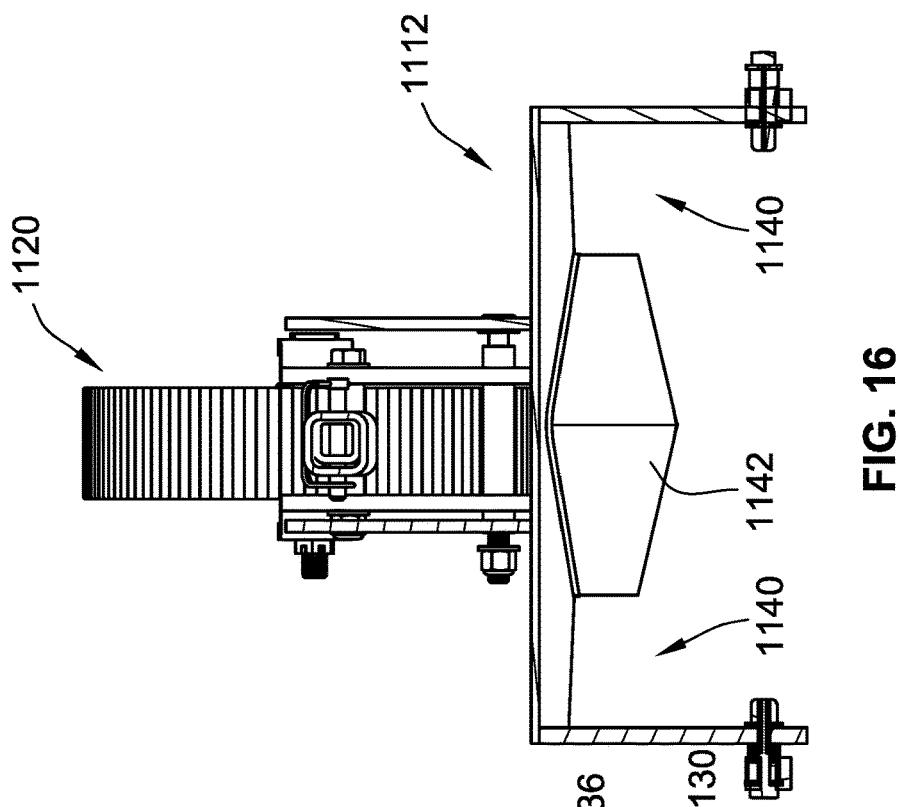
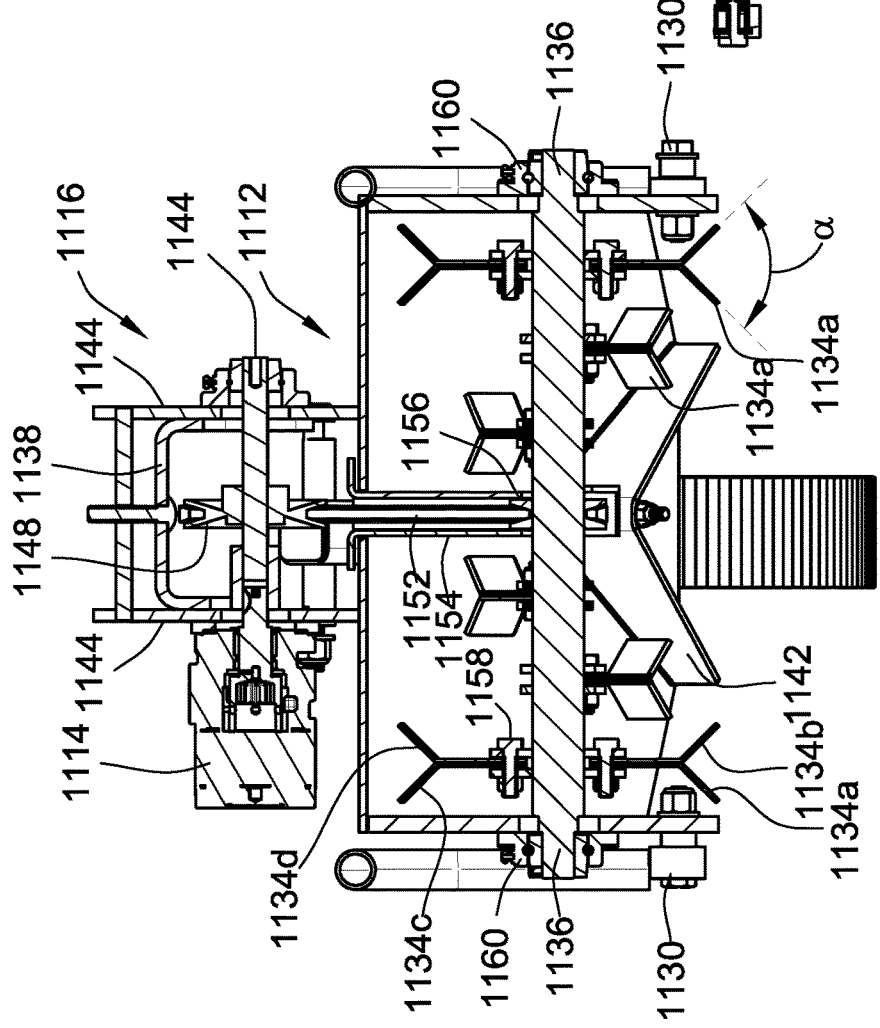
FIG. 15
FIG. 16

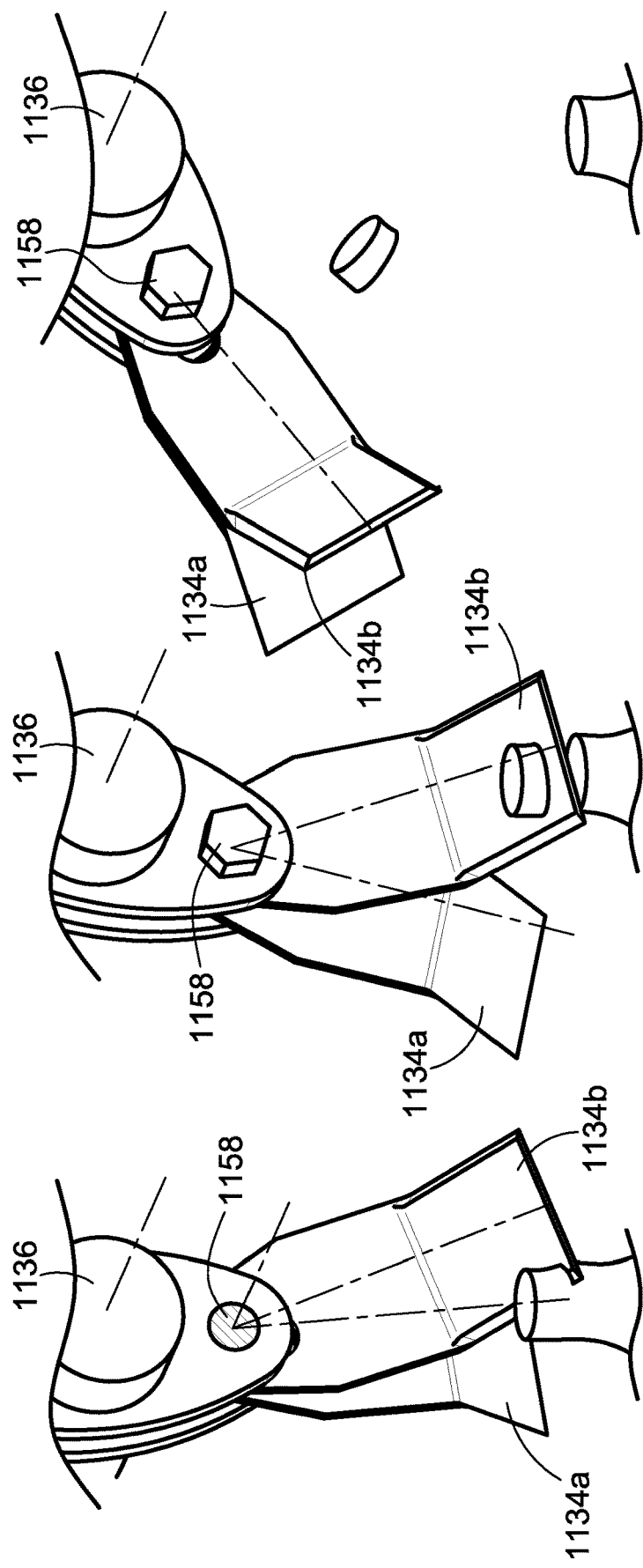

AGRICULTURAL MOWING DEVICE

CROSS-REFERENCE TO RELATED APPLICATIONS

This application is a continuation-in-part of U.S. patent application Ser. No. 15/392,731, titled "Agricultural Cutting Device for Weed Control," filed on Dec. 28, 2016, which in turn claims priority to U.S. Provisional Patent Application No. 62/271,770 titled "Agricultural Cutting Device For Weed Control," filed on Dec. 28, 2015, which are incorporated herein by reference in their respective entireties.

FIELD OF THE INVENTION

The present invention relates generally to agricultural equipment and, more particularly, to a cutting device for mowing between adjacent crop rows in a field containing a planted crop.

SUMMARY OF THE INVENTION

In accordance with one embodiment, a cutting device attaches to a tractor to allow mowing between rows of planted crops, such as corn, soybeans, etc., in an agricultural field, and optionally delivering weed-control and other substances.

In accordance with another embodiment, an agricultural mowing device includes a plurality of cutting devices for controlling material between the rows in a planted field, the cutting devices being positioned between respective adjacent rows of planted matter in a field. Each cutting device includes a pivotable shaft having an upper end and a lower end, and a mowing device attached to the lower end of the pivotable shaft. The mowing device includes rotatable blades for mowing material growing between adjacent rows of the planted crop or crops. The system further includes at least one motor coupled to one or more of the cutting devices for driving the rotatable blade of each mowing device.

A mowing device for mowing material between rows of planted crops in an agricultural field, comprises a series of mower assemblies attached to a tractor and spaced from each other so that each mower assembly is located between an adjacent pair of rows of a printed crop, multiple blades mounted for rotation on each mower assembly for cutting material growing in the space between adjacent pairs of rows of a planted crop, a first tapered deflector in front of each mower assembly for pushing foliage of a planted crop growing on opposite sides of the mower assembly, laterally away from the mower assembly, and a second tapered deflector within each mower assembly and located rearwardly of the blades for pushing cut material laterally toward the adjacent rows of a planted crop.

A preferred cutting device is a flail mower, which may be self-powered or driven by a power take-off on a tractor. This type of cutting device is often used to provide a rough cut to taller grass where contact with loose debris may be possible. Rows of "flails" (also referred to as knives or blades) may be attached (using chain links or brackets) to a rotating horizontal drum, tube, rotor or axle perpendicular to the direction of travel of the tractor. The rows of flails are preferably staggered to provide a complete cut. Standard flails are shaped like an extruded "T" or "Y" and a chain attaches to the bottom. If a flail strikes an immovable object, it simply bounces off.

BRIEF DESCRIPTION OF THE DRAWINGS

The invention may best be understood by reference to the following description taken in conjunction with the accompanying drawings.

FIG. 1 is a perspective view illustrating a cutting device with a single weed-control unit and a single motor.

FIG. 2 is a perspective view illustrating an agricultural system with multiple weed-control units driven by a single motor.

FIG. 15 is an enlarged section taken along line 15-15 in FIG. 14.

FIG. 16 is an enlarged section taken along line 14-14 in FIG. 14 with the mowing device turned upside down.

FIGS. 19A-19D are enlarged perspective views of one pair of mowing blades in the agricultural mowing device shown in FIG. 10.

DETAILED DESCRIPTION OF ILLUSTRATED EMBODIMENTS

Figure 3:
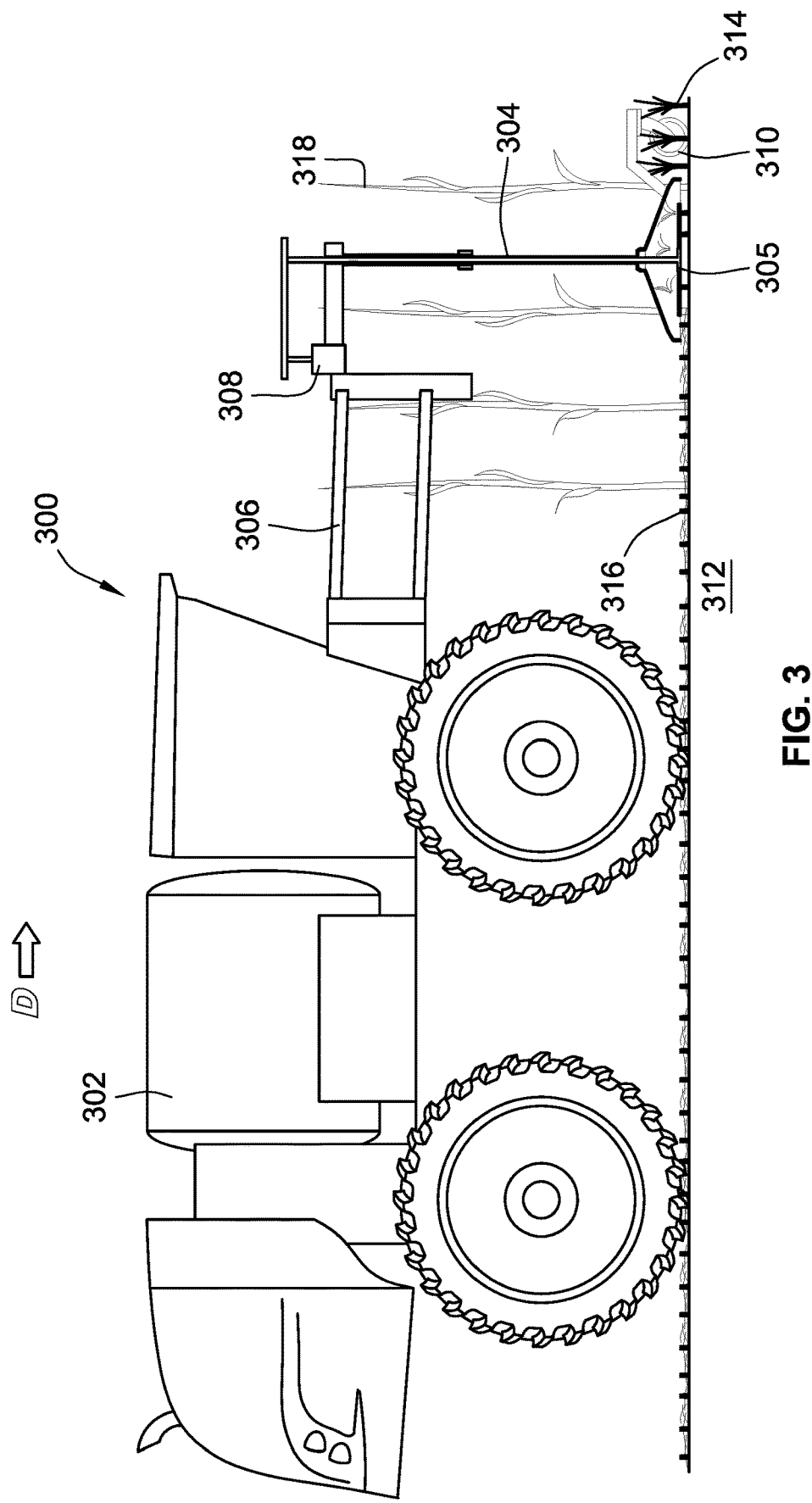
FIG. 3 is a side view illustrating an agricultural system with an agricultural vehicle attached to a weed-control unit having a single motor and a front gauge wheel.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings and referring initially to FIG. 1, a cutting device 100 is attachable to an agricultural towing vehicle, e.g., a tractor, for mowing and/or spraying weeds located between rows in a field of planted crops. The device 100 includes a vertically adjustable shaft 102 that is attached, at an upper end 104, to the towing vehicle via an attachment link 106 and, at a lower end 108, to a weed-control unit 110. The weed-control unit 110 includes a dedicated motor 112 and a rotatable cutting blade 114. By way of example, the motor 112 is a hydraulic or electric motor. The device 100 further includes a sprayer input with one or more sprayer input tubes 116 that are coupled to an end of the weed-control unit 110 for delivering weed-control and/or other substances.

The device 100 is advanced between adjacent rows of planted matter, such as a left row 120 and a right row 122 of plants 124 in a field 126. As the device 100 is advanced, it mows growing weeds 128 with the cutting blade 114 to clear a reduced or weed-free path 130 between the rows 120, 122. In addition to, or instead of, the mowing achieved by the cutting blade 114, the device 100 further outputs one or more weed-control substances from the sprayer input tubes 116. The weed-control substance is helpful in reducing and/or preventing the reappearance of weeds in the path 130.

Referring to FIG. 2, an agricultural system 200 includes multiple cutting devices 202 driven by a single motor 204. The cutting devices 202 include a left device 202A, a center device 202B, and a right device 202C, with each device having a respective shaft 206. In this example, the shaft 206 has a fixed height, with all the devices 202 having the same height.

The motor 204 is mounted to an upper end of the shaft 206 of the center device 202B. In turn, each upper end of the left and right devices 202A, 202C is coupled via a respective rotating belt or chain 208 to the center device 202B. As such, the single motor 204 drives all the devices 202 simultaneously, and is located in the center of the device so that the edges can be located as close to the planted crop as possible.

Referring to FIG. 3, an agricultural system 300 has an agricultural vehicle 302 that is attached to a cutting device 304 via a frame linkage 306. The device 304 has a weed-control unit 305, a single motor 308, and a front gauge wheel 310. As the device 304 advances in a direction D along a field 312, growing weeds 314 are mowed and/or treated with weed-control substances to achieve a generally weed-free or reduced-weed path 316 between the rows of planted matter 318.

Figure 4:
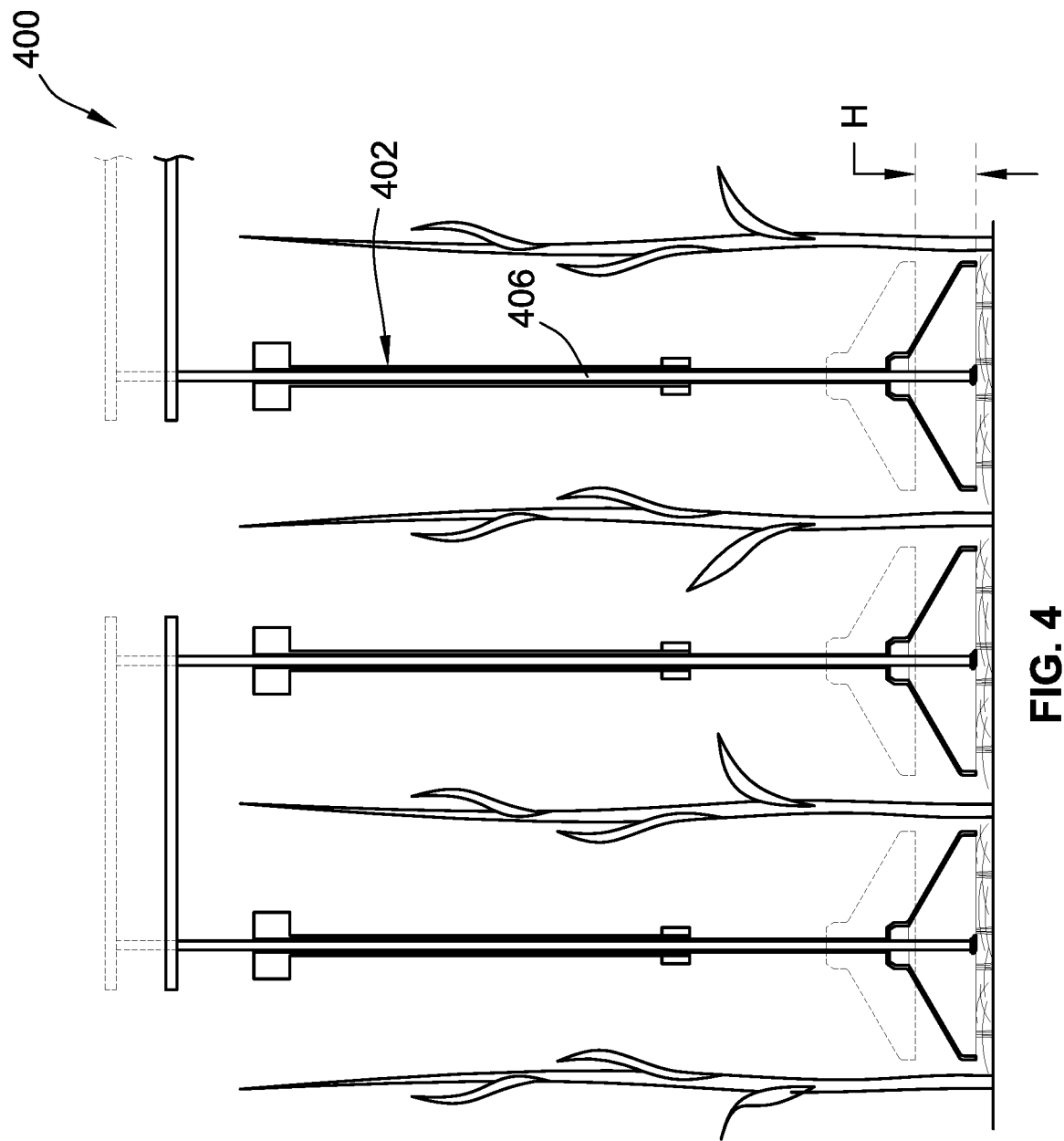
FIG. 4 is a rear view illustrating height adjustment of weed-control units.

Referring to FIG. 4, an agricultural system 400 has a plurality of cutting devices 402 with respective weed-control units 404 and shafts 406. The shafts 406 are adjustable, having an H range of positions, in accordance with a weed height present in the field. As applicable, the devices 402 are generally similar (but not necessarily identical) to and include one or more components of the devices 100, 202 and 304 described above and illustrated in FIGS. 1-3.

Figure 5:
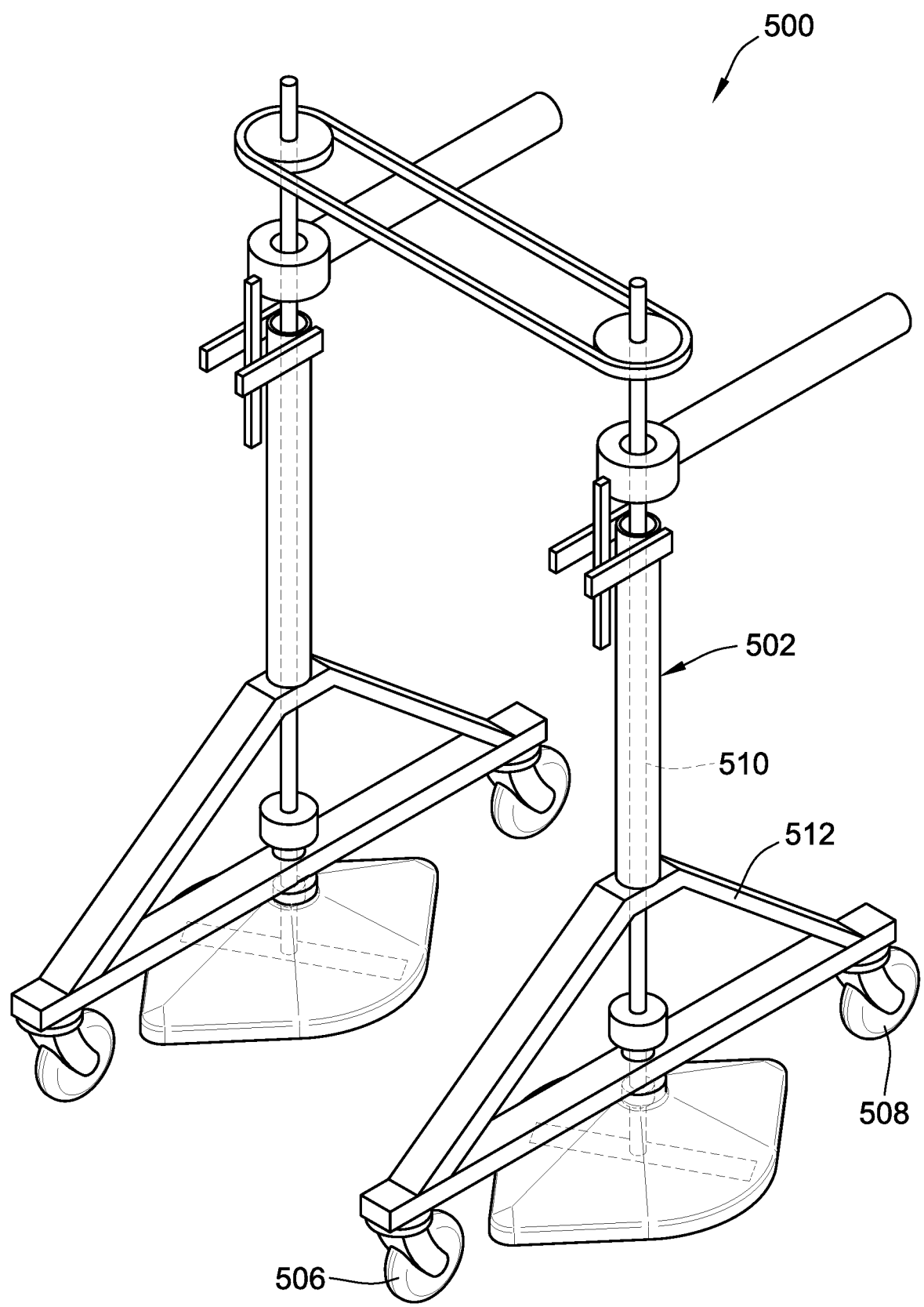
FIG. 5 is a perspective view illustrating weed-control units with front and rear gauge wheels.

Referring to FIG. 5, an agricultural system 500 has a plurality of cutting devices 502 with respective weed-control units 504. Each device 502 has a pair of gauge wheels that includes a front gauge wheel 506 and a rear gauge wheel 508. The gauge wheels 506, 508 are mounted to a shaft 510 via a gauge frame 512.

Figure 6:
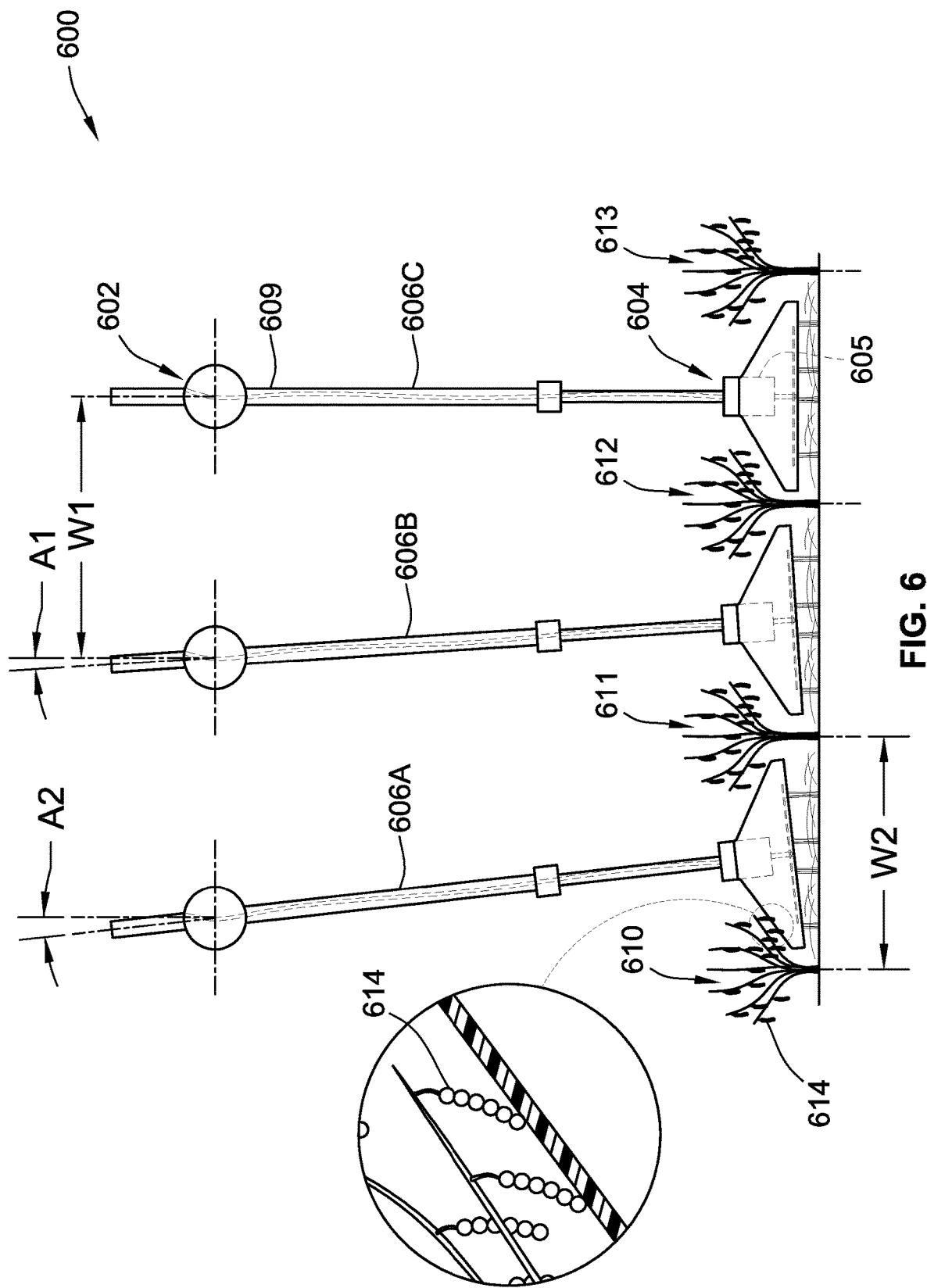
FIG. 6 is a rear view illustrating pivoting movement of weed-control units.

Referring to FIG. 6, an agricultural system 600 has a plurality of pivotable cutting devices 602 with respective weed-control units 604 and motors 605. The weed-control units 604 are attached to lower ends of respective shafts 606, which include an outer protective shield 608 and an internal substance-insertion tube 609. The shafts 606 are independently pivotable at various angles, such as angles A1 and A2, with each shaft 606 pivoting between respective rows 610-613 of plants 614. For example, a left shaft 606A pivots at an angle A2 between a first row 610 and a second row 611, while a center shaft 606B simultaneously pivots at an angle A1 between the second row 611 and a third row 612.

The pivoting feature allows the devices 602 to be spaced across rows at distances that are not necessarily the same width. For example, a right shaft 606C is spaced away from the center shaft 606B at a width W1 that is greater than the space by which the left shaft 606A is spaced away from the center shaft 606B (at a smaller width W2).

Figure 7:
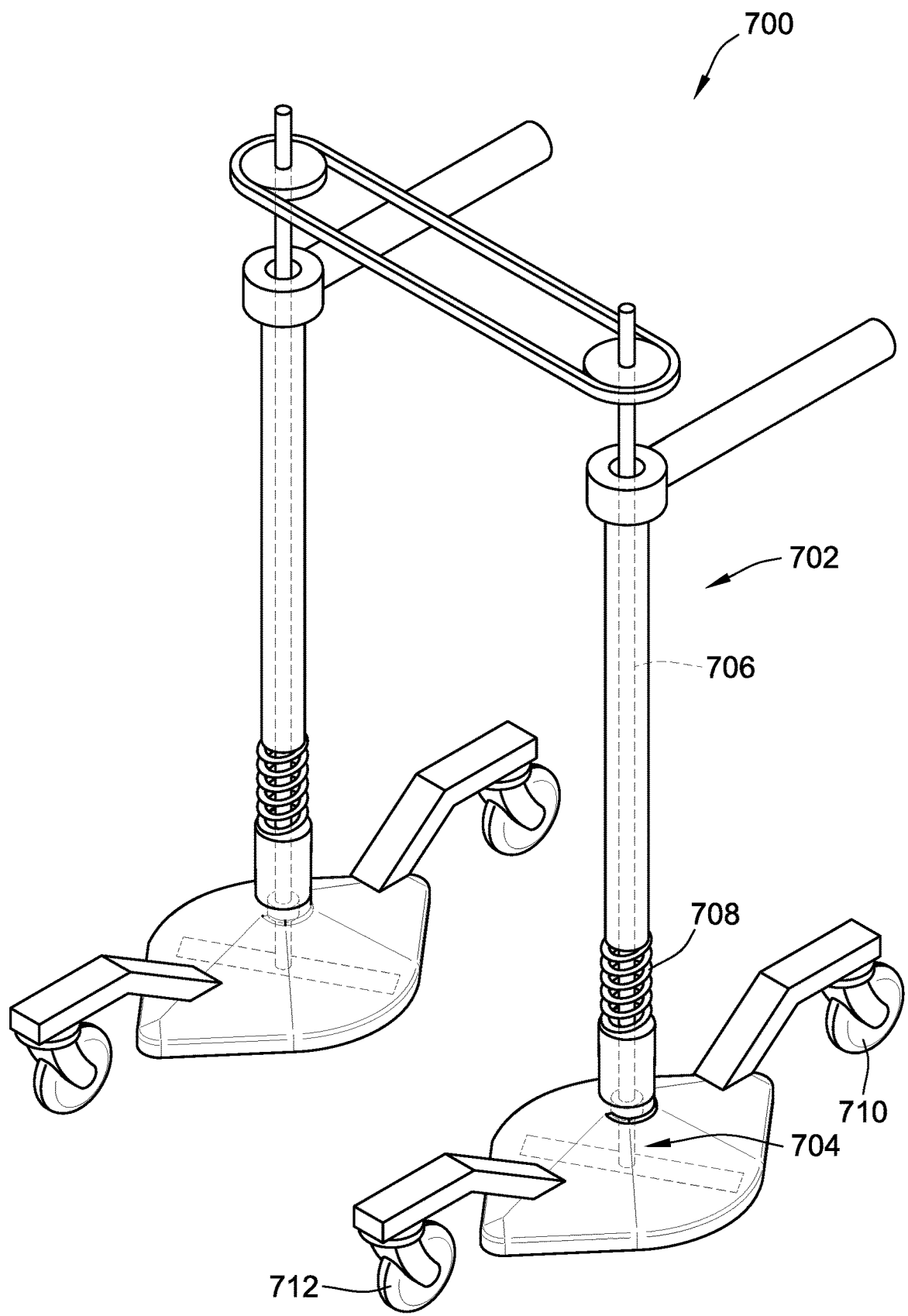
FIG. 7 is a perspective view illustrating spring-loaded weed-control units with front and rear gauge wheels.

Referring to FIG. 7, an agricultural system 700 has a plurality of cutting devices 702 with respective weed-control units 704. Each cutting device 702 has a shaft 706 with a spring-loaded element 708 at a lower end that is attached to the weed-control unit 704. The spring-loaded element 708 allows automatic adjustment of the weed-control unit 704 when passing over uneven terrain or weeds. The weed-control units 704 further include a pair of front and rear gauge wheels 710, 712.

Figure 8:
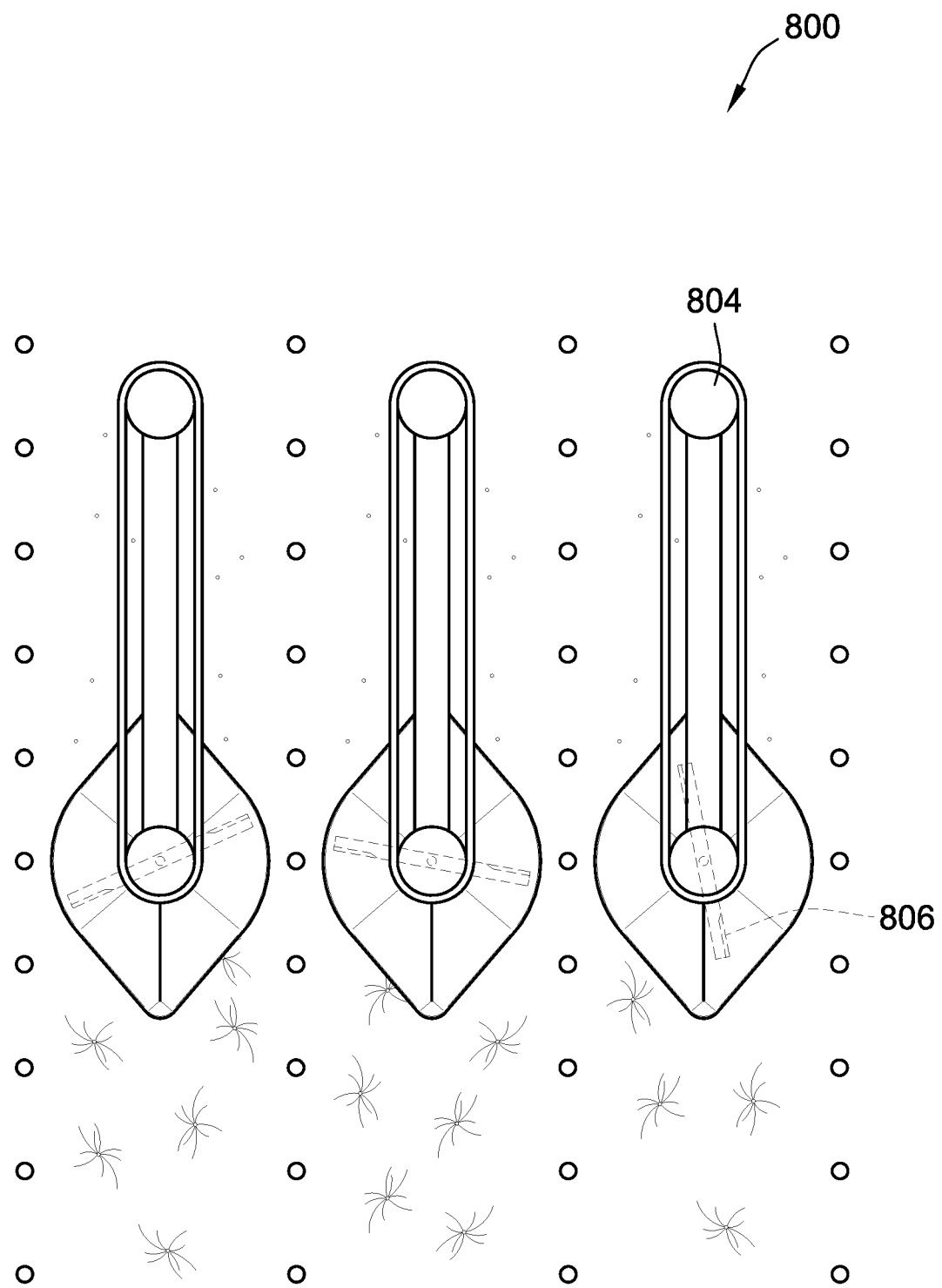
FIG. 8 is a top view illustrating single weed-control units with respective motors.

Referring to FIG. 8, an agricultural system 800 has a plurality of cutting devices 802 with respective motors 804. The devices 802 have cutting blades 806 that are independently powered, respectively, by the motors 804.

Figure 9:
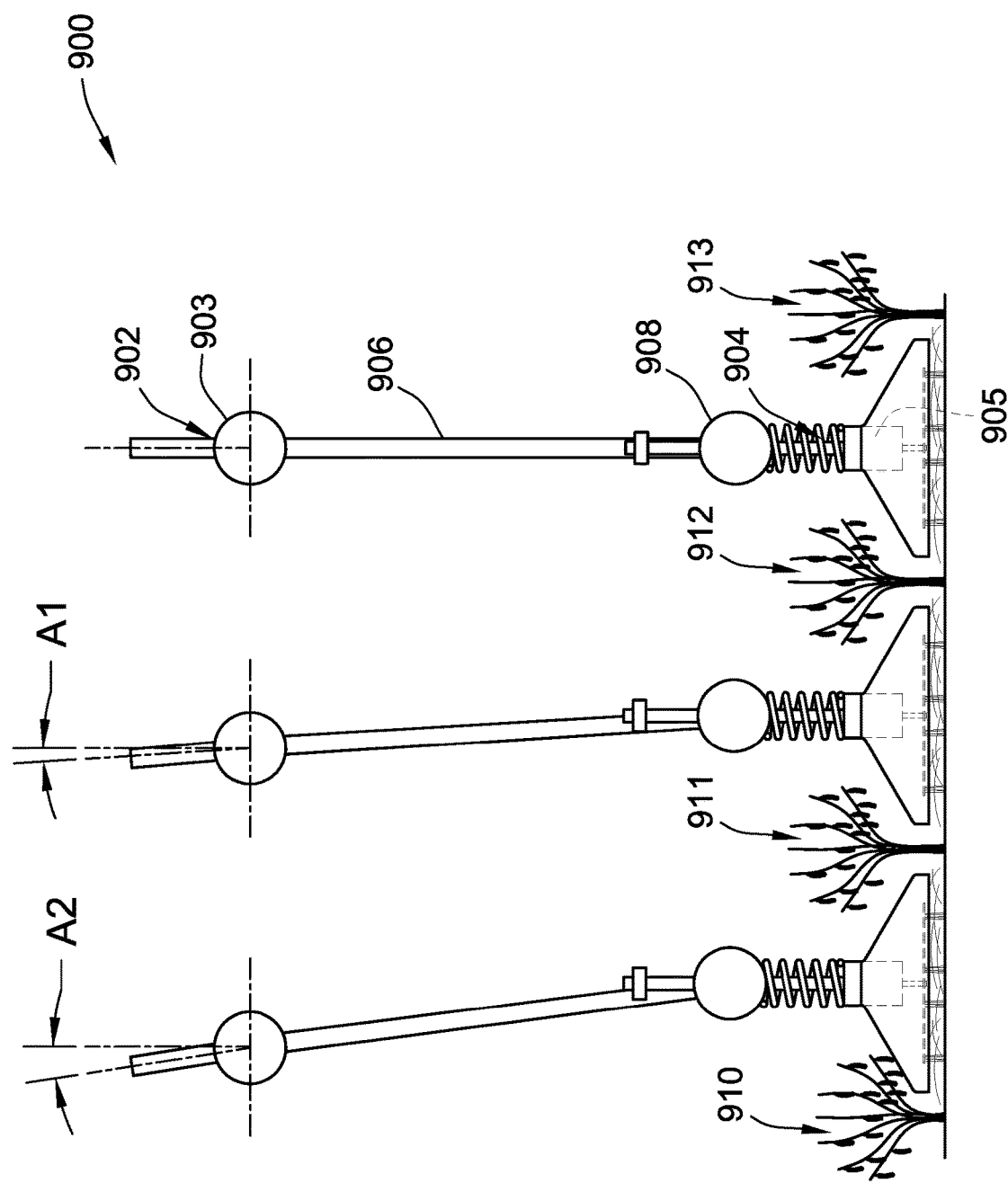
FIG. 9 is a rear view illustrating pivoting movement of weed-control units with a spring-loaded element.
Figure 10:
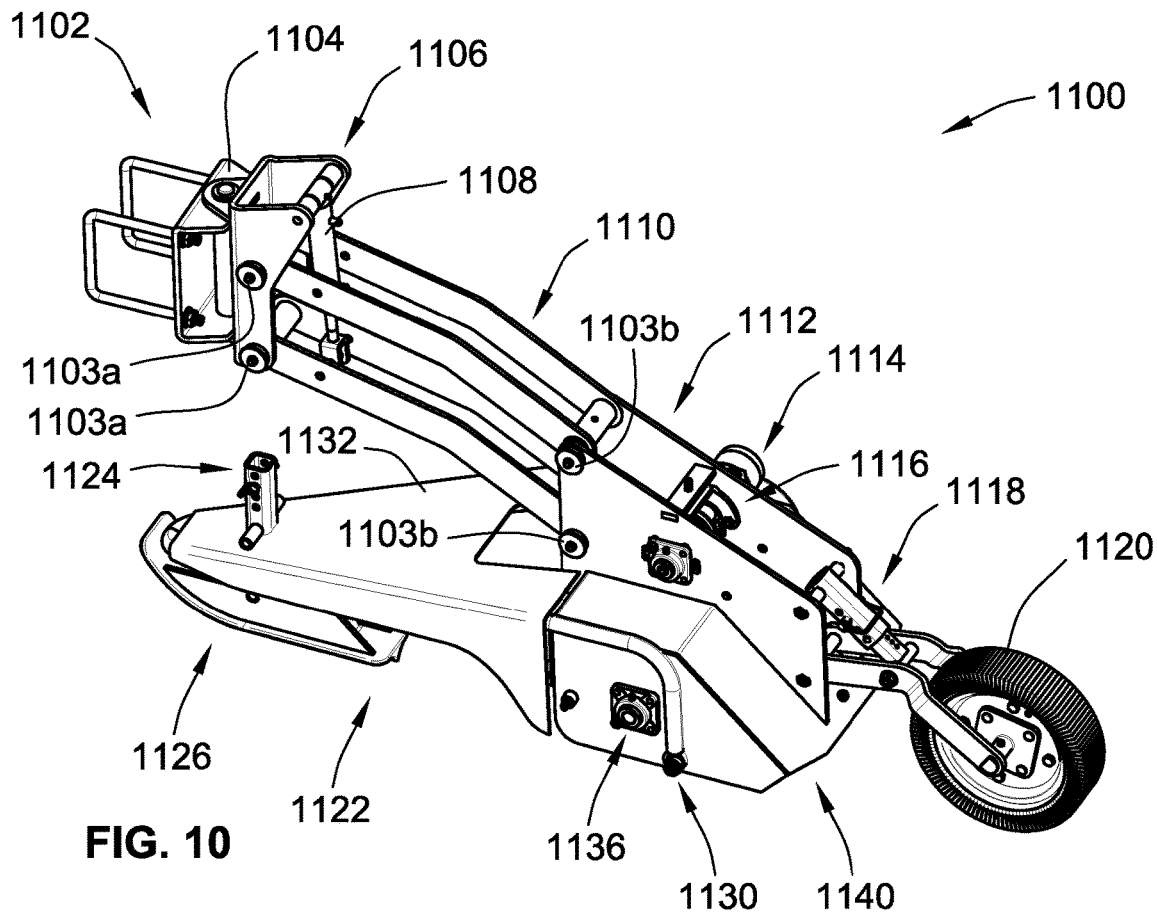
FIG. 10 is a top perspective view illustrating an agricultural mowing device.
Figure 11:
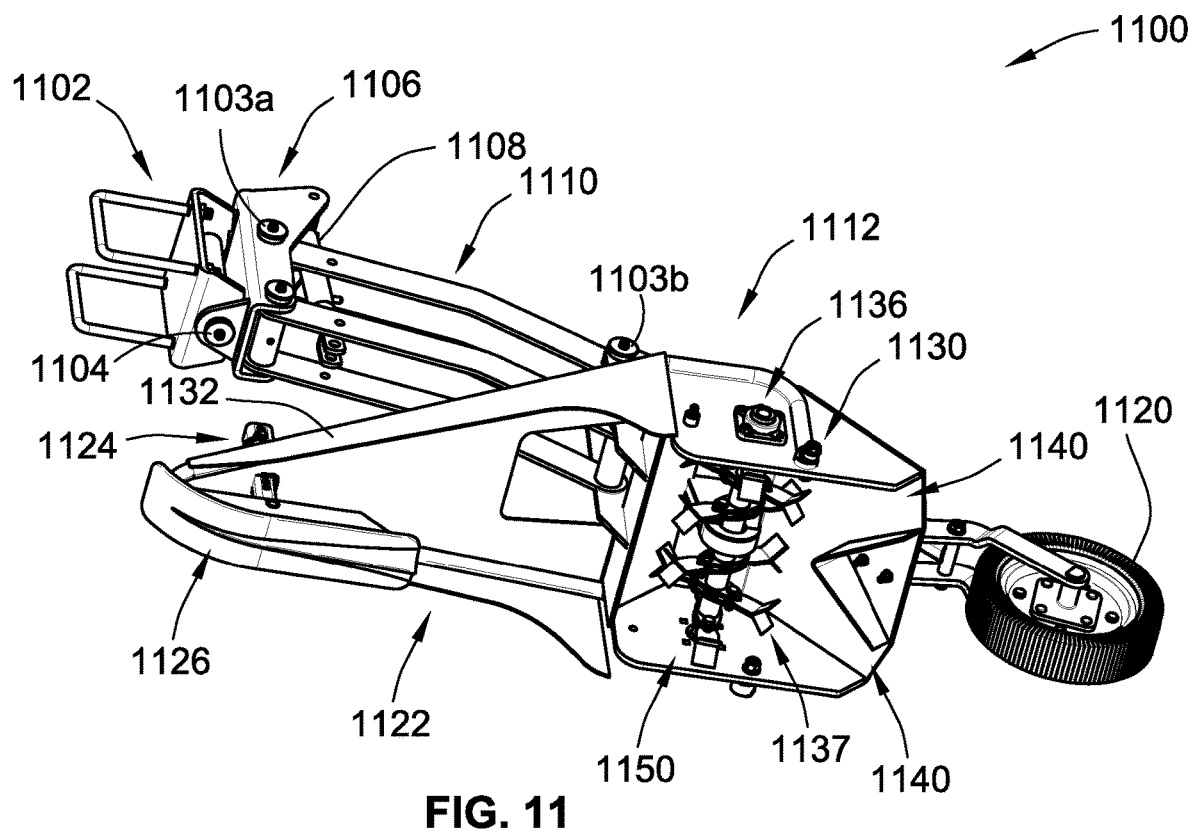
FIG. 11 is a bottom perspective view of the agricultural mowing device shown in FIG. 10.
Figure 12:
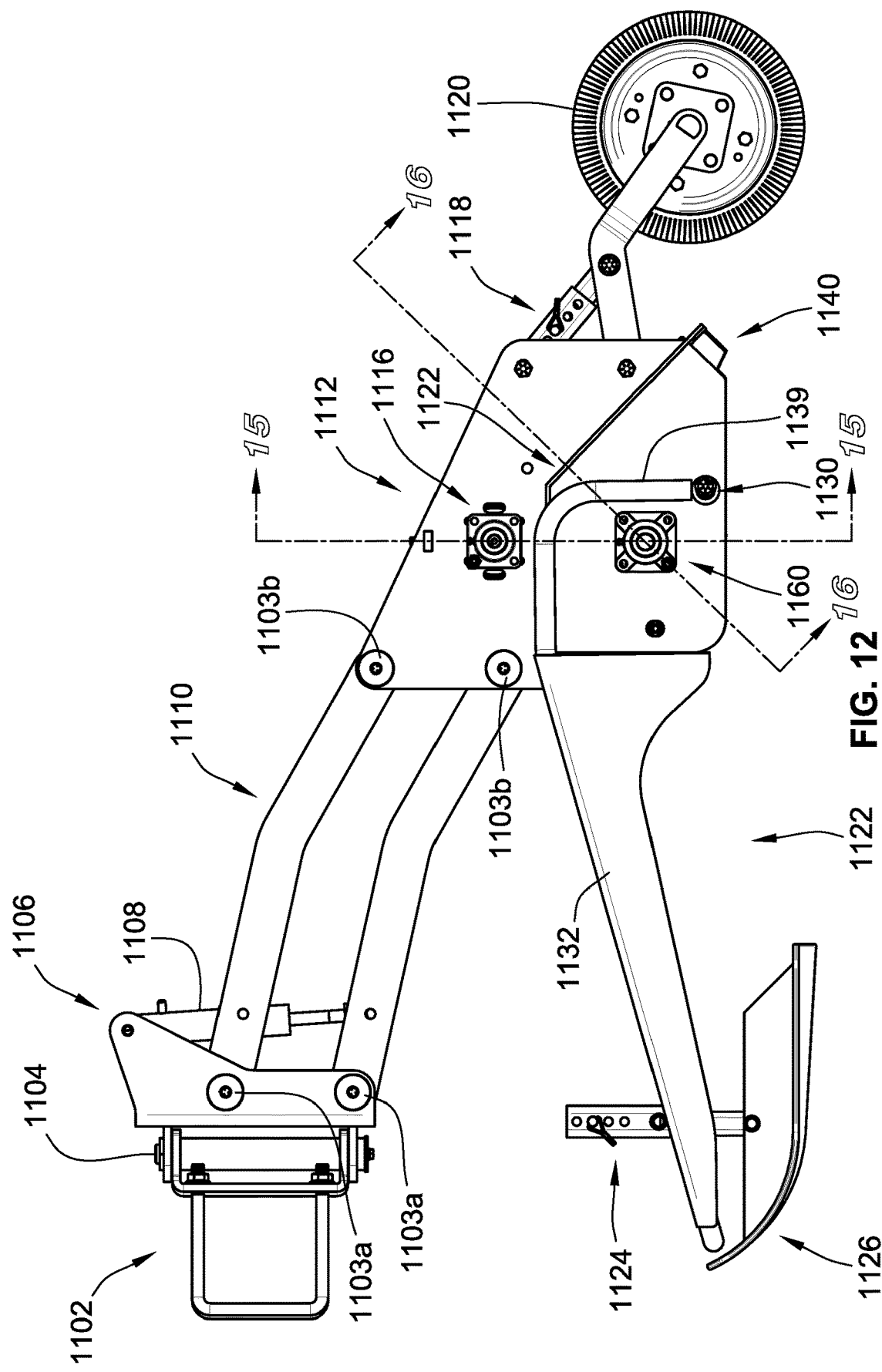
FIG. 12 is an enlarged side elevation view of the agricultural mowing device shown in FIG. 10.
Figure 13:
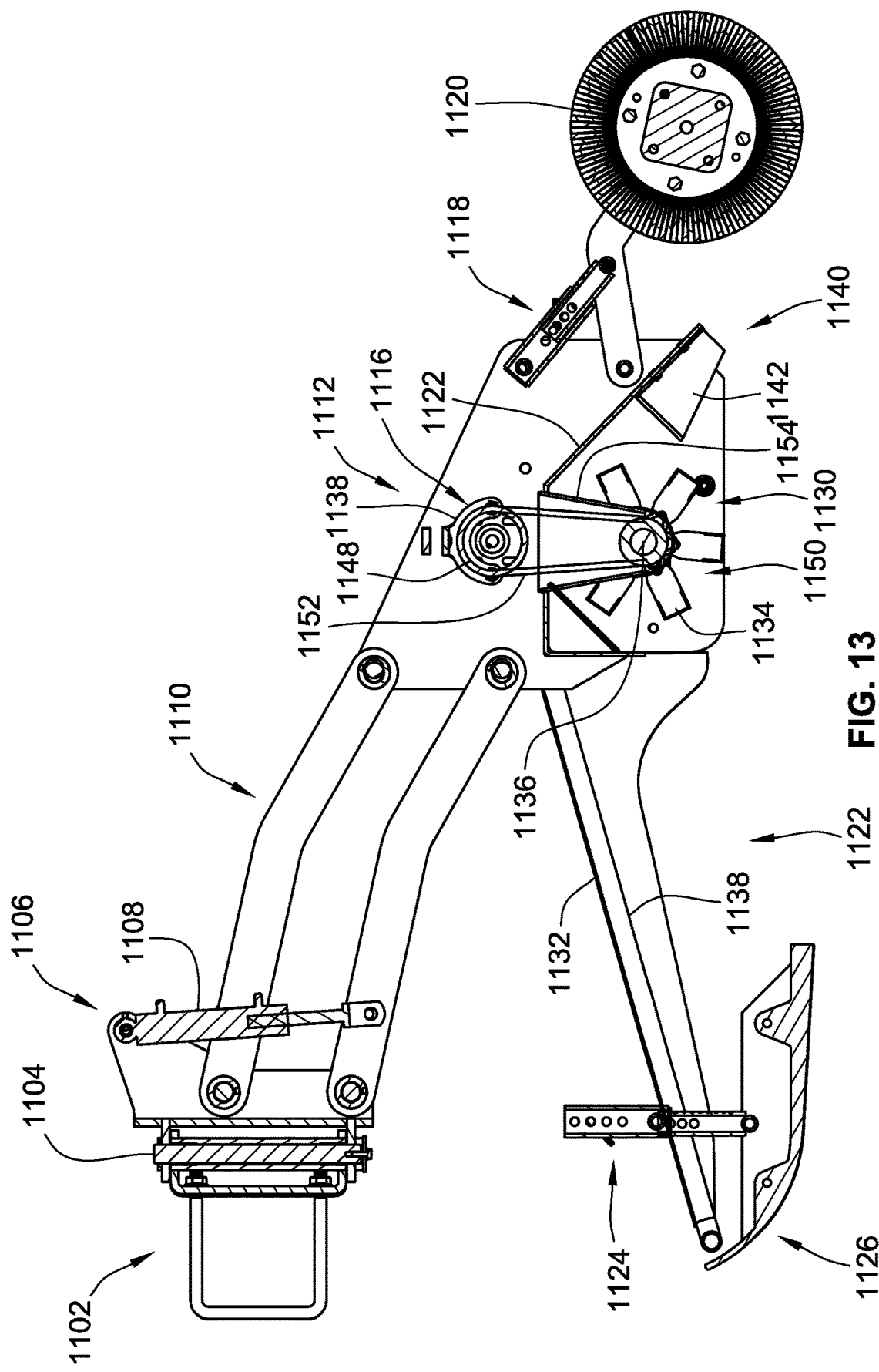
FIG. 13 is a sectional view taken along a longitudinal section taken along a longitudinal plane extending through the center of the agricultural mowing device shown in FIG. 10.
Figure 14:
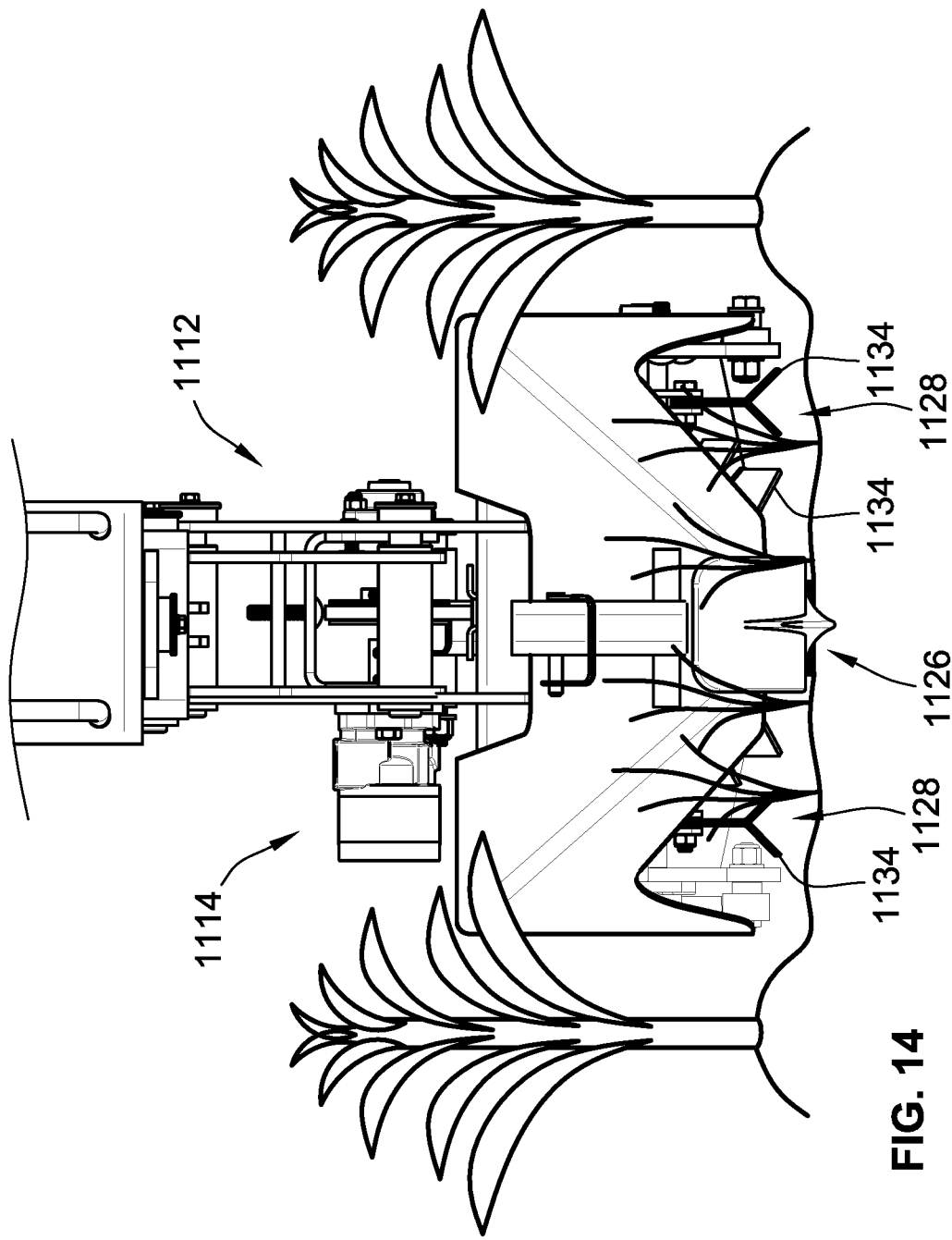
FIG. 14 is an end elevation taken from the front end of the agricultural mowing device shown in FIG. 10.
Figure 17:
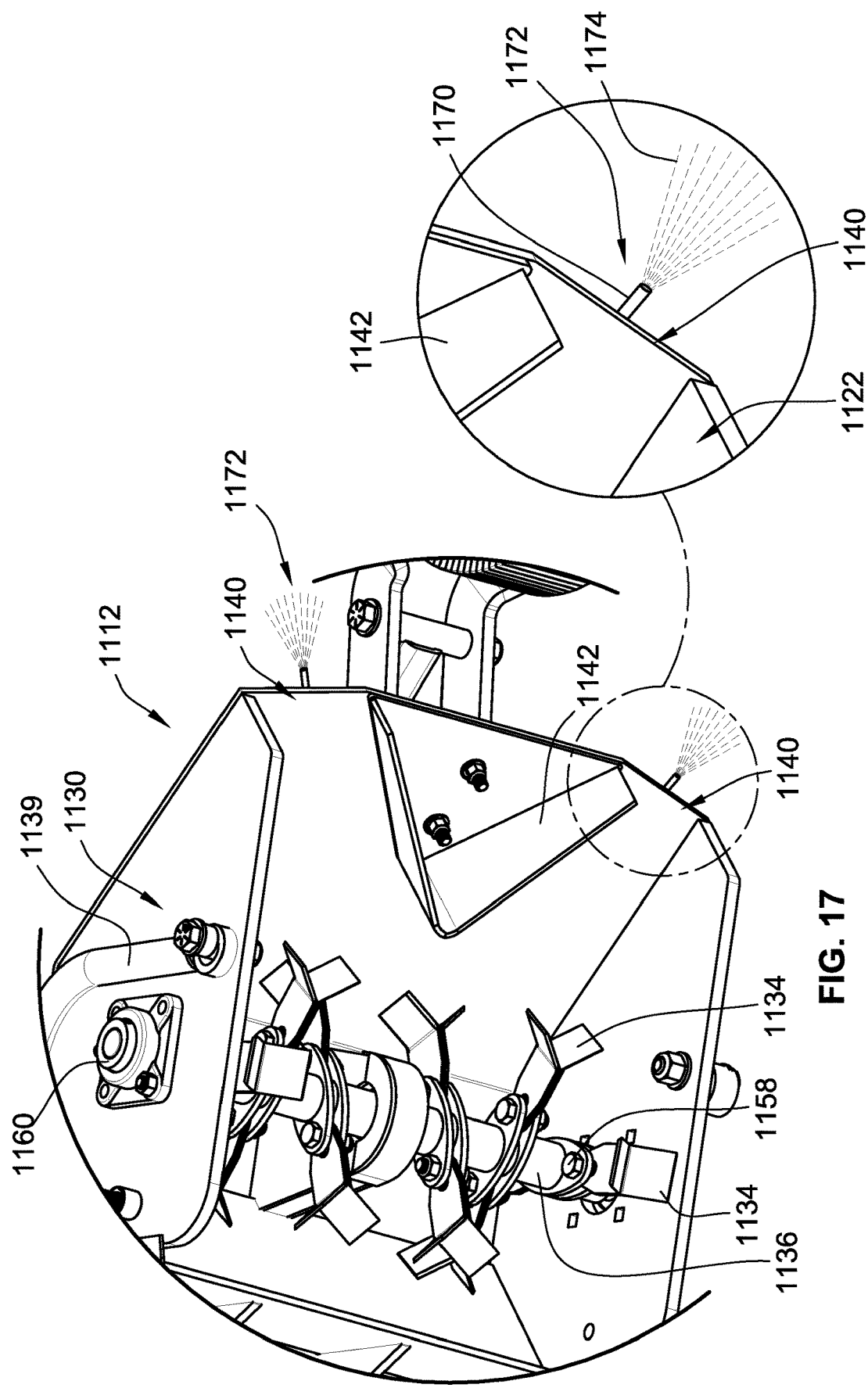
FIG. 17 is an enlarged perspective view taken from the bottom of the mowing blades in the agricultural mowing device shown in FIG. 10.
Figure 18:
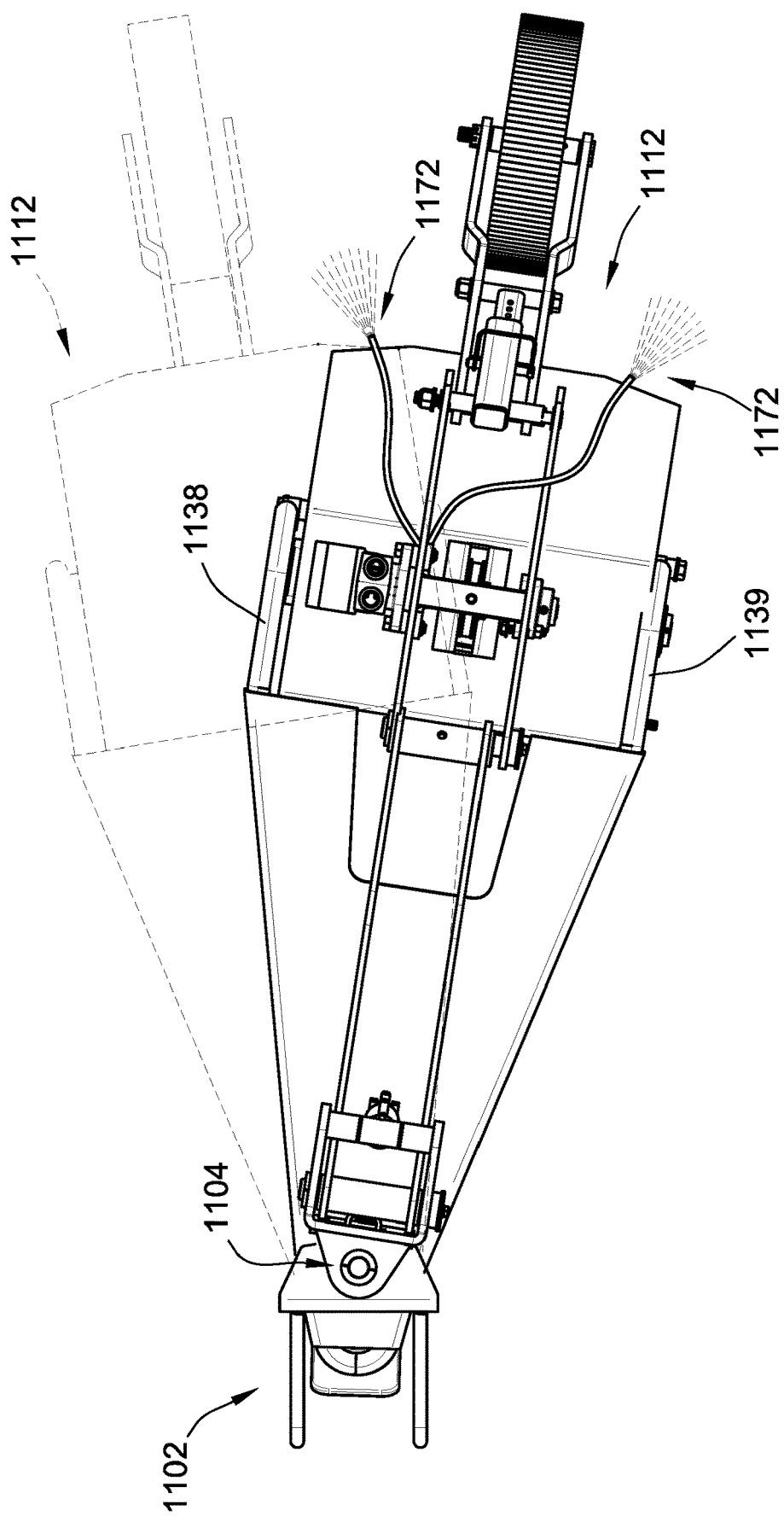
FIG. 18 is a top view of the agricultural mowing device shown in FIG. 10.
Figure 19A:
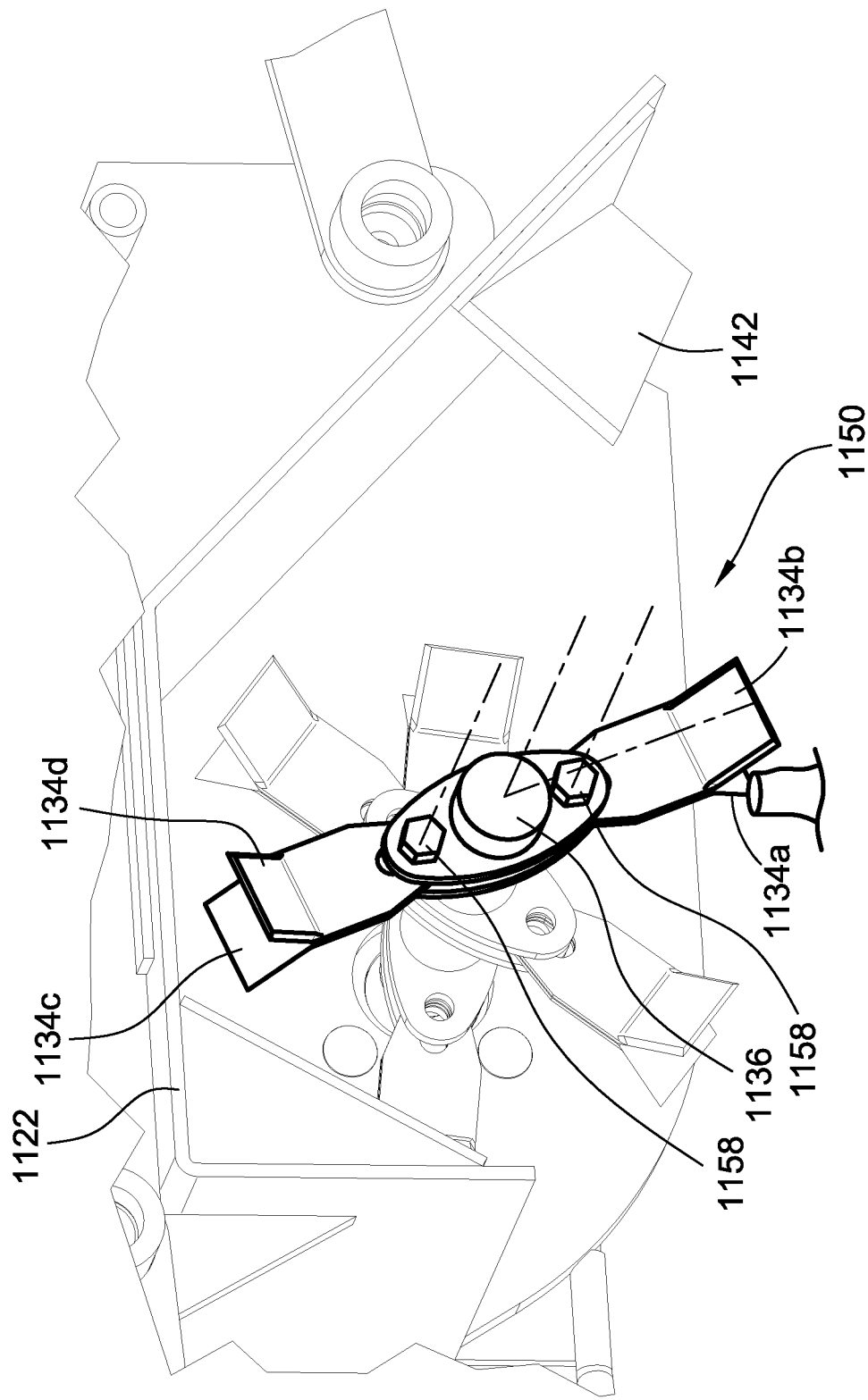

Referring to FIG. 9, an agricultural system 900 has a plurality of pivotable cutting devices 902 with respective weed-control units 904 and motors 905. The weed-control units 904 are attached to lower ends of respective shafts 906, which are independently pivotable at various angles (such as angles A1 and A2). A spring-loaded element 907 is mounted at the lower end of each shaft 906 to allow self-adjustment of the weed-control unit 904 over uneven terrain or weeds.

The pivoting motion of the devices 902 is achieved, in part, by a top bearing element 903 and/or a bottom bearing element 908. The bottom bearing element 908, which is at a fixed distance from the top bearing element 903, allows the weed-control unit 904 to float parallel to the ground (in response to the weight of the weed-control unit 904). The height of the weed-control unit 904 is optionally maintained at a desired height via gauge wheels. Alternatively, according to another example, the height of the weed-control unit 904 is maintained via a motor drive unit mounted inside the shaft 906 or inside the bottom bearing element 908.

FIGS. 10-18 illustrate a modified mowing device that includes a 4-bar linkage 1110 for attaching a cutting device 1112 to a tractor by a mounting assembly 1102. A vertical pivot pin 1104 in the mounting assembly 1102 permits the 4-bar linkage 1110, and thus the cutting device, to be pivoted horizontally relative to the tractor. Two pairs of horizontal pivot pins 1103a and 103b at opposite ends of the 4-bar linkage 1110 permit that linkage to be pivoted vertically relative to the mounting assembly 1102. A hydraulic cylinder 1108 connected between the mounting assembly 1102 and the 4-bar linkage 110 applies a controllable down pressure on the 4-bar linkage 1110 and thus on the cutting device 1112.

The cutting device 1112 includes a housing 1113 that is supported between a skid 1126 on the front and a rear wheel 1120 that is able to be adjusted up and down with an assembly 1118 that is one part of the height setting of the blade assemblies 1137. The housing 1113 contains a shaft 136 that carries four pairs of blade assemblies 1137 for cutting off weeds or other material at a level just slightly above the ground surface, in the area between adjacent rows of a planted crop, without cutting the crop plants. The shaft 1136 that carries the blade assemblies 1137 is driven by a motor 1114 mounted on the outside surface of one of the side walls of the housing 1113. The side walls are pivoted on the lower front ends of rods 1138 and 1139 that also support the front portion of the top wall 1132 of the housing 1113, which is narrow enough to fit between adjacent rows of a planted crop. The pivoted mounting of the housing 1113 permits the tapered front wall of the housing to float upwardly over obstacles, and the front skid 1126 and the rear wheel 1120 enable the device 1112 to float over the surfaces of such obstacles. The tapered front end of the housing allows it to run in canopied crops.

The blade assemblies 1137 preferably include flail blades 1134 to deal with relatively heavy grass or scrub, particularly where contact with loose debris may be possible. As depicted in FIGS. 15 and 16, adjacent pairs of the flail blades 1134 in the blade assemblies 1137 are staggered with respect to each other to provide a complete cut. The flail blades 1134 are shaped like a "T" or "Y." If a flail blade strikes an immovable object, it simply bounces off.

The cutting device 1112 has a front shield 1122 with a top wall 1132 that helps guide the mower assembly in turns because the skid 1126 does not turn in reference to the main assembly 1112. The rods 1138 and 1139 that support the front shield 1122 are connected to the cutting device 1112 via pivot points 1130, which allows the shield to move up and down with the ground, and pushes the planted crop (e.g., corn, beans and other crops) away from the mower.

The flail blades 1134 are driven by a motor 1114 connected to a shaft 1144 which turns an upper pulley 1148, and a belt or chain 1152 within a shield 1154 turns a tiller blade pulley 1156 that is connected to a tiller blade shaft 1136. The motor 1114 may be a hydraulic or electric motor, or could be replaced with a PTO driveshaft or a ground drive.

This blade shaft 1136 has pivot bolts 1158 mounted on it with cutting blades 1134 that pivot around the bolts, this allows the cutting blades 1134 to hit a weed, for example, and grab the weed and move at a different speed than the shaft 1136.

The material cut by the flail blades 1134 is discharged rearwardly into a rear discharge area 1140 where a deflector 1142 guides the mowed clippings to both of the adjacent rows of planted crop, to provide sun coverage and/or to decompose and feed both rows of planted crop. This covers the roots of the crop plants to provide shade and additional weed control within the planted rows.

Each blade assembly has two pairs of flailing cutters mounted on opposite ends of the blade assembly. The other portions of each pair of flailing cutters are bent away from each other. The inner end portions of the cutters have elongated apertures through which fastening boats pass to attach the cutters between a pair of an elliptical plate attached to a driven shaft. Thus, the rotating shaft rotates each pair of cutters in a vertical circular path, so that the bent portions pass repeatedly over the surface of the soil. The side edges of the bent portions of the cutters thus slice the stems and leaves of any weeds or other material in the area between adjacent rows of the planted crop.

A flail mower is a type of powered garden/agricultural equipment, which is used to deal with heavier grass/scrub which a normal lawn mower could not cope with. Some smaller models are self-powered, but many are PTO driven implements, which can attach to the three-point hitches found on the rear of most tractors. This type of mower is best used to provide a rough cut to taller grass where contact with loose debris may be possible such as roadsides.

The flail mower gets its name from the use of "flails" attached to its rotating horizontal drum (also called tube, rotor, or axle). Many implement companies also refer to the flails as knives or blades. The rows of flails are usually staggered to provide a complete cut. The flails are attached to the drum using chain links or brackets, depending on the manufacturer. The rotating drum is perpendicular to the axis of the tractor. The PTO driveshaft along the tractor's axis must make a right angle through the use of a gearbox in order to transfer its rotational energy to the drum. As the drum rotates, centrifugal force pushes the flails outward.

Standard flails are shaped like an extruded "T" or "Y" and a chain attaches to the bottom. There are also proprietary flails with various shapes for shredding larger brush and others that leave a smooth, finish cut.

If a flail strikes an immovable object, it simply bounces off. Other rotary type mowers have a tendency to grab and throw the object out of the mower deck if its small enough. This fact makes the flail mower best suited for areas where thrown objects would cause damage.

Figure 20:
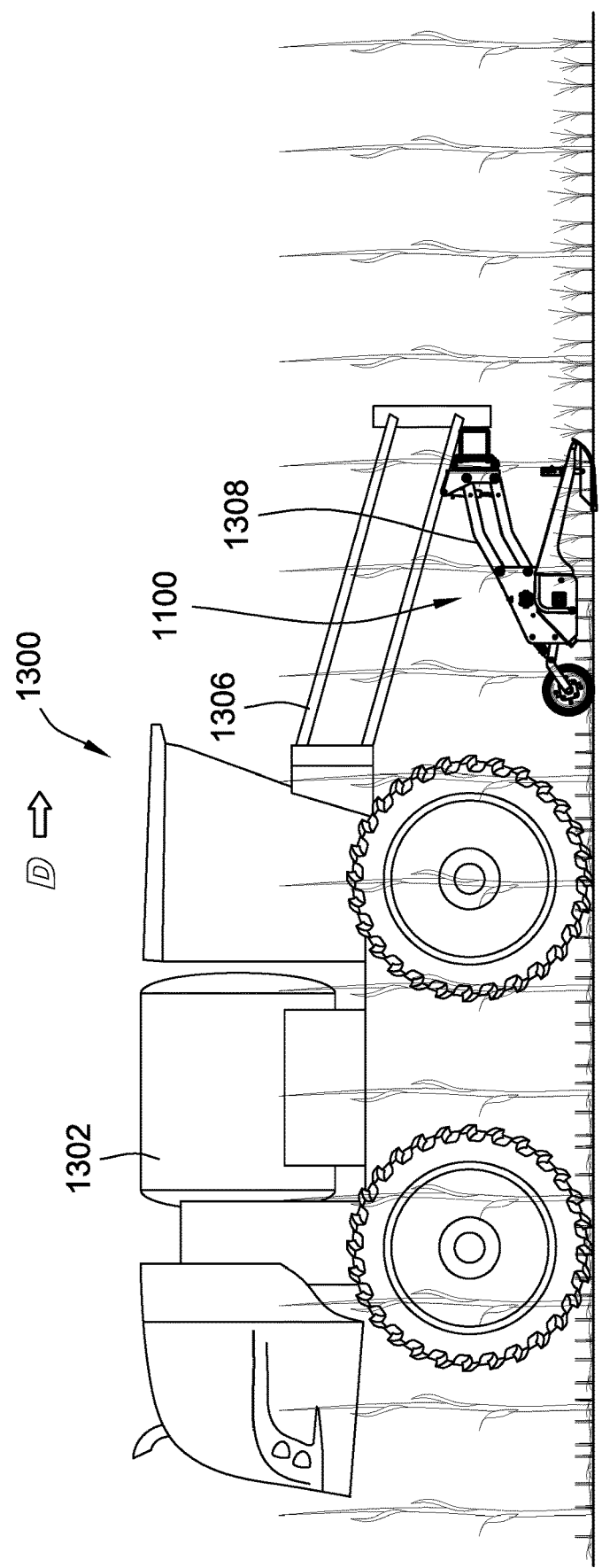
FIG. 20 illustrates a mower attached to a front end of a high-clearance sprayer type vehicle.

FIG. 20 illustrates the mower attached to the front end of a high-clearance sprayer type vehicle 1300. The mower is mounted on a controllable support arm 1306 projecting from the front end of the vehicle 1300, so that the mower can be raised above the height of planted crops so that the mower does not mow crop plants at the end of a field. For example, the height of the mower can be controlled in response to a UPS signal and/or an optical camera row steering system.

It will be evident to those skilled in the art that the invention is not limited to the details of the foregoing illustrated embodiment and that the present invention may be embodied in other specific forms without departing from the spirit or essential attributes thereof. For example, the present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A mowing device for mowing between adjacent crop rows in a field containing a planted crop, the mowing device comprising:
   a 4-bar linkage for attachment to a towing vehicle;
   a skid plate mechanically coupled to the 4-bar linkage for enabling the mowing device to float upwardly over surfaces of obstacles encountered between the adjacent crop rows, the skid plate being mounted in a front position of the mowing device;
   multiple blades mounted for rotation on a shaft, the shaft being located rearwardly of the skid plate;
   a front shield positioned in the front position of the mowing device near the skid, the front shield pushing the planted crop away from the mowing device; and
   a rear discharge area positioned rearwardly of the multiple blades, the rear discharge area receiving material cut by the multiple blades in the form of mowed clippings; and
   a deflector located rearwardly of the rear discharge area for guiding the mowed clippings laterally away from a center of the mowing device to both of the adjacent crop rows.

2. The mowing device of claim 1, wherein the blades are flailing blades.

3. The mowing device of claim 2, wherein the flailing blades are located in front of the deflector and the blades are spaced across the space between the rows of planted crops.

4. The mowing device of claim 1, further comprising a plurality of blade assemblies for rotating the blades.

5. The mowing device of claim 4, wherein each blade assembly of the plurality of blade assemblies is staggered with respect to another blade assembly of the plurality of blade assemblies to provide a complete cut.

6. The mowing device of claim 1, further comprising an end that is supported by a vertically adjustable wheel, the wheel controlling a vertical distance between the blades and the ground beneath the blades.

7. The mowing device of claim 1, further comprising a controllable lifting device for lifting the front shield off the ground when passing over planted crops.

8. The mowing device of claim 1, wherein the planted crop is pushed laterally away from the mowing device.

* * * * *

UNITED STATES PATENT AND TRADEMARK OFFICE
CERTIFICATE OF CORRECTION

PATENT NO. : 10,980,174 B2  
APPLICATION NO. : 15/941613  
DATED : April 20, 2021  
INVENTOR(S) : Joseph D. Bassett It is certified that error appears in the above-identified patent and that said Letters Patent is hereby corrected as shown below:

In the Claims

Column 6, Line 47 (Claim 1, Line 13), please delete "mowing device near the skid," and insert --mowing device near the skid plate,-- therefor.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*